United States Patent
Wehner

(10) Patent No.: US 9,108,802 B2
(45) Date of Patent: Aug. 18, 2015

(54) CONVEYING DEVICE WITH A PLANAR CONVEYING ELEMENT

(75) Inventor: Jurgen Wehner, Berg (CH)

(73) Assignee: WRH WALTER REIST HOLDING AG, Ermatingen (CH)

(*) Notice: Subject to any disclaimer, the term of this patent is extended or adjusted under 35 U.S.C. 154(b) by 0 days.

(21) Appl. No.: 14/235,204

(22) PCT Filed: Jul. 19, 2012

(86) PCT No.: PCT/CH2012/000169
§ 371 (c)(1),
(2), (4) Date: Feb. 20, 2014

(87) PCT Pub. No.: WO2013/016833
PCT Pub. Date: Feb. 7, 2013

(65) Prior Publication Data
US 2014/0151196 A1  Jun. 5, 2014

(30) Foreign Application Priority Data

Jul. 29, 2011  (CH) .......................................... 1268/11
Jan. 18, 2012  (CH) ............................................ 85/12

(51) Int. Cl.
| | |
|---|---|
| *B65G 15/60* | (2006.01) |
| *B65G 15/20* | (2006.01) |
| *B65G 23/12* | (2006.01) |

(Continued)

(52) U.S. Cl.
CPC . *B65G 15/28* (2013.01); *B60P 1/38* (2013.01); *B65G 15/12* (2013.01); *B65G 15/20* (2013.01); *B65G 15/60* (2013.01); *B65G 23/06* (2013.01); *B65G 23/22* (2013.01); *B65G 23/12* (2013.01)

(58) Field of Classification Search
CPC .......... B60P 1/38; B65G 15/60; B65G 15/28; B65G 15/12; B65G 23/22; B65G 23/06; B65G 23/12; B65G 15/20
USPC .................................. 198/817, 834, 835, 842
See application file for complete search history.

(56) References Cited

U.S. PATENT DOCUMENTS 3,934,707 A * 1/1976 Bowman .................... 198/460.1
3,952,861 A * 4/1976 Holmqvist et al. ........... 198/816

(Continued)

FOREIGN PATENT DOCUMENTS

| CH | 568216 | 10/1975 |
|---|---|---|
| CH | 701358 | 12/2010 |

(Continued)

*Primary Examiner* — Mark A Deuble
(74) *Attorney, Agent, or Firm* — Rankin, Hill & Clark LLP

(57) ABSTRACT

A conveying device with a revolving, extensively extended conveying member with an upper run section and with a lower run section, wherein the conveying member is deflected in two head-end regions that lie opposite one another. The conveying device includes a drive device arranged in a head-end region and having an electric drive motor and a drive shaft coupled thereto. The drive shaft has at least one drive member for driving the conveying member at least partly wrapping the drive member. The drive motor includes a motor shaft that is connected to drive shafts arranged on both sides of the motor, wherein the motor shaft and the drive shafts are arranged coaxially. The drive device is arranged within the conveying device between side limitation devices and between the upper and lower run sections and, in the conveying direction, is arranged between the two head-ends of the conveying member.

22 Claims, 22 Drawing Sheets

(51) Int. Cl.
*B65G 23/06* (2006.01)
*B65G 15/28* (2006.01)
*B60P 1/38* (2006.01)
*B65G 23/22* (2006.01)
*B65G 15/12* (2006.01)

(56) References Cited

U.S. PATENT DOCUMENTS

| | | | |
|---|---|---|---|
| 4,157,753 A | | 6/1979 | Garnier |
| 4,511,028 A | | 4/1985 | Meister |
| 5,934,862 A | | 8/1999 | Brown et al. |
| 2006/0289282 A1* | 12/2006 | Freudelsperger | ............ 198/817 |
| 2010/0230249 A1* | 9/2010 | Ertel | ............ 198/834 |
| 2011/0073443 A1 | | 3/2011 | Trivette |
| 2011/0139581 A1* | 6/2011 | Umezawa et al. | ............ 198/570 |

FOREIGN PATENT DOCUMENTS

| | | |
|---|---|---|
| DE | 2745875 | 4/1978 |
| DE | 3634135 | 6/1987 |
| DE | 9316012 | 1/1994 |
| DE | 10032189 | 1/2002 |
| DE | 10303195 | 8/2004 |
| DE | 102006004421 | 8/2006 |
| DE | 102006053913 | 5/2008 |
| DE | 102007017628 | 10/2008 |
| EP | 1477437 | 11/2004 |
| EP | 2119646 | 11/2009 |
| EP | 2289823 | 3/2011 |
| FR | 2420492 | 10/1979 |
| GB | 383463 | 11/1932 |
| GB | 2191755 | 12/1987 |

\* cited by examiner

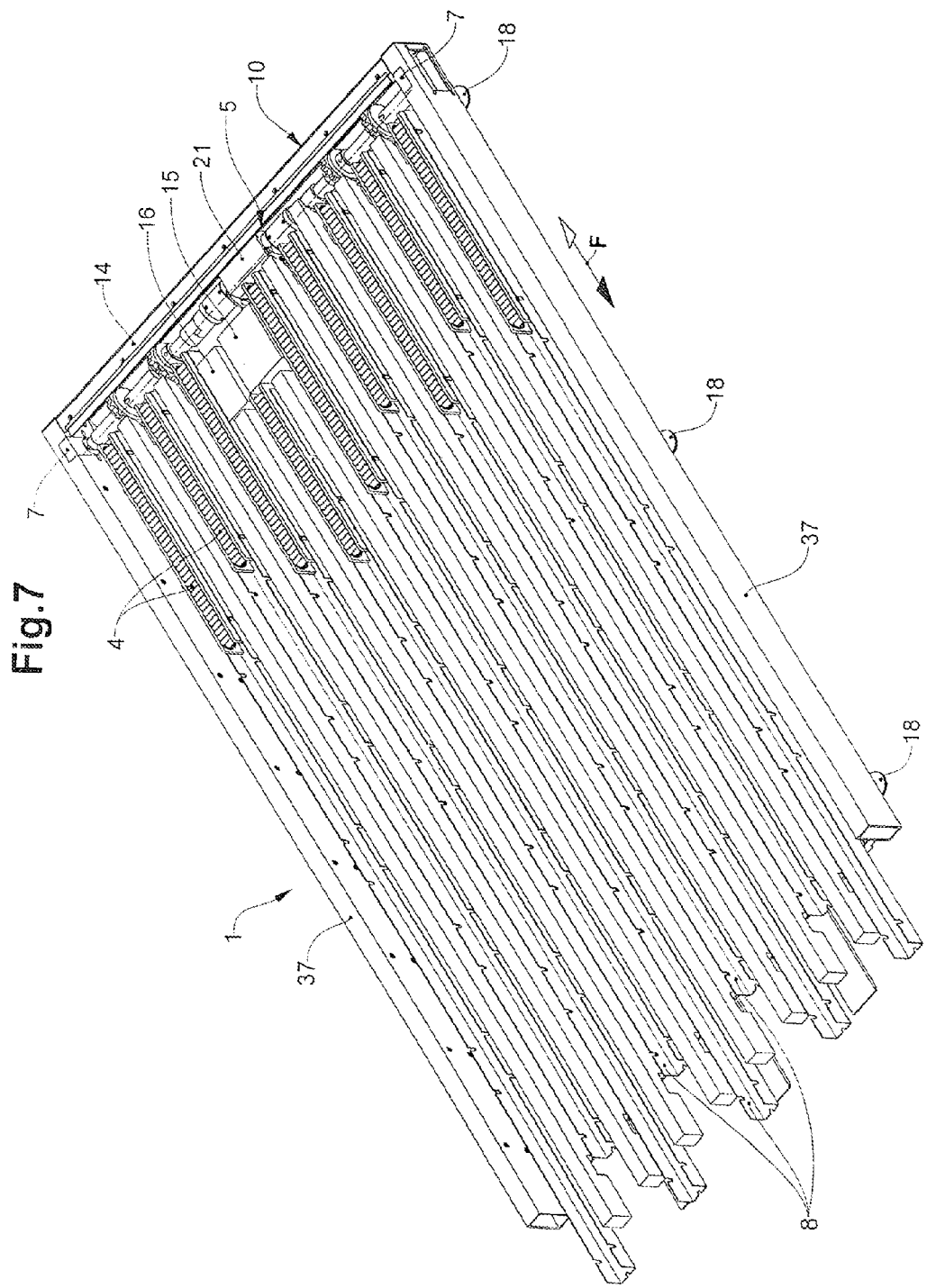

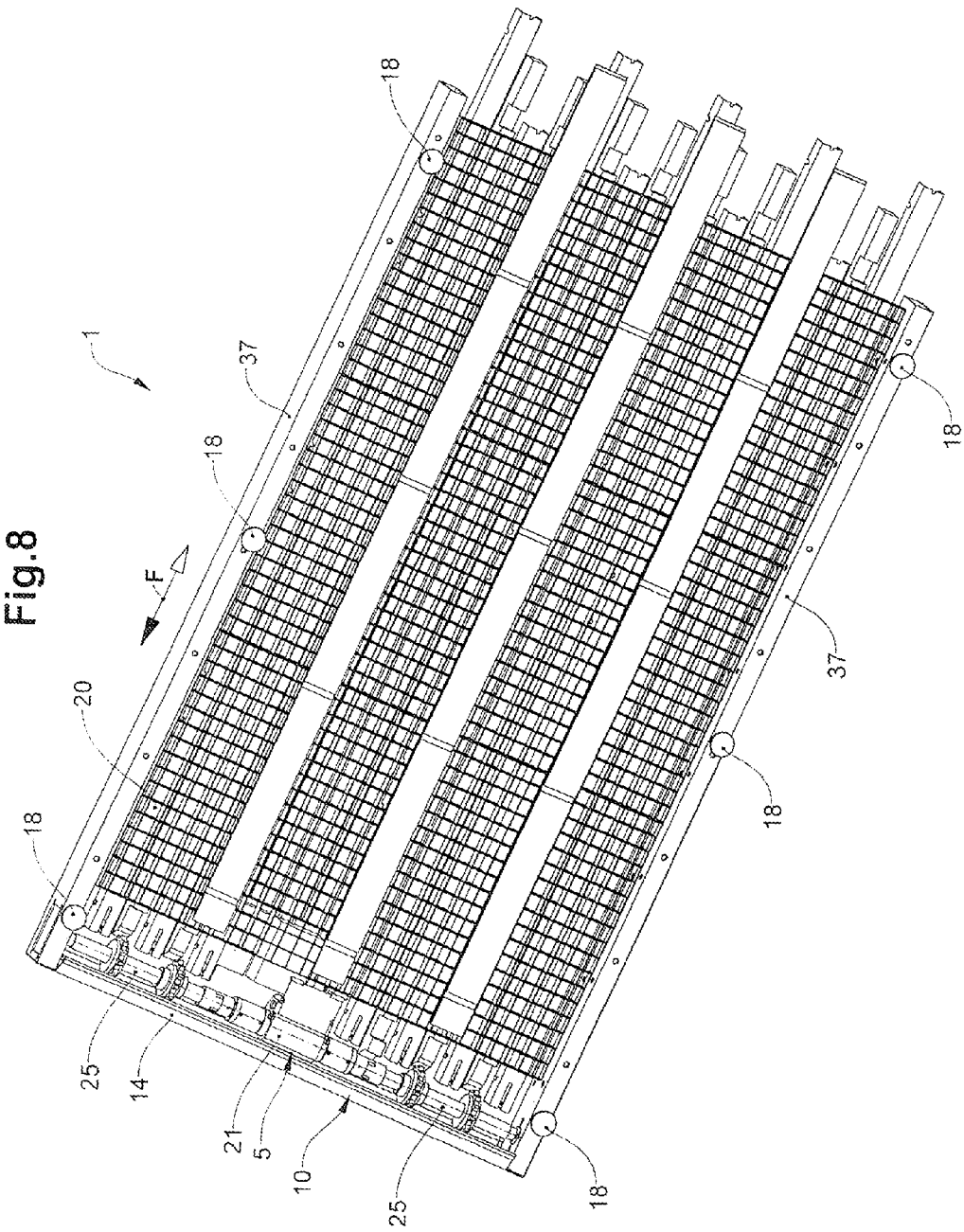

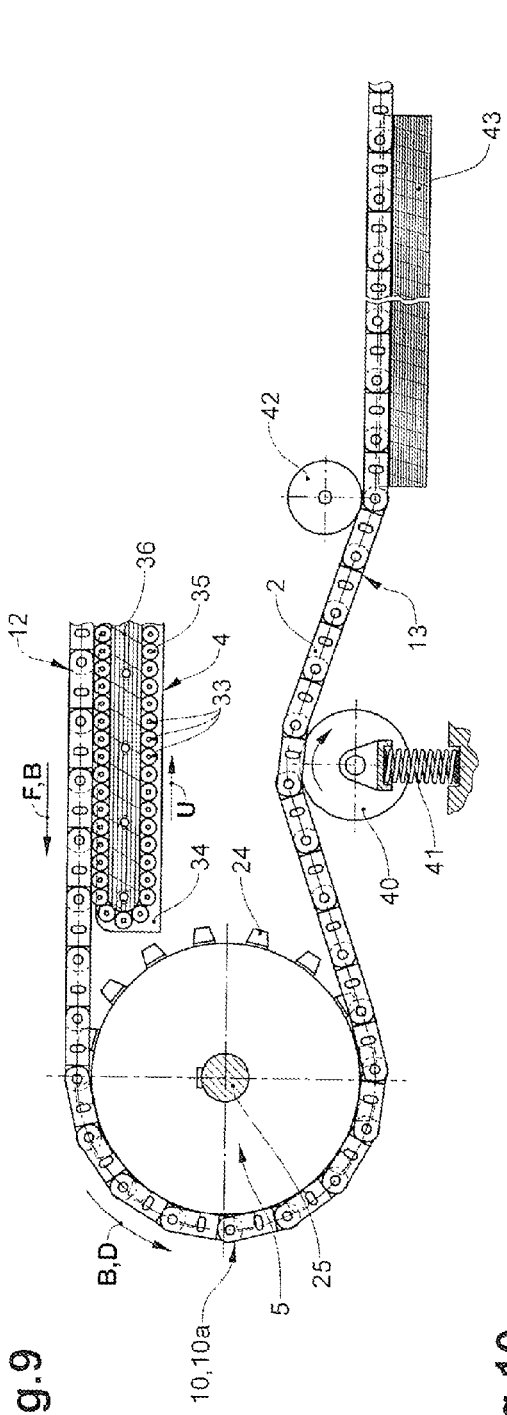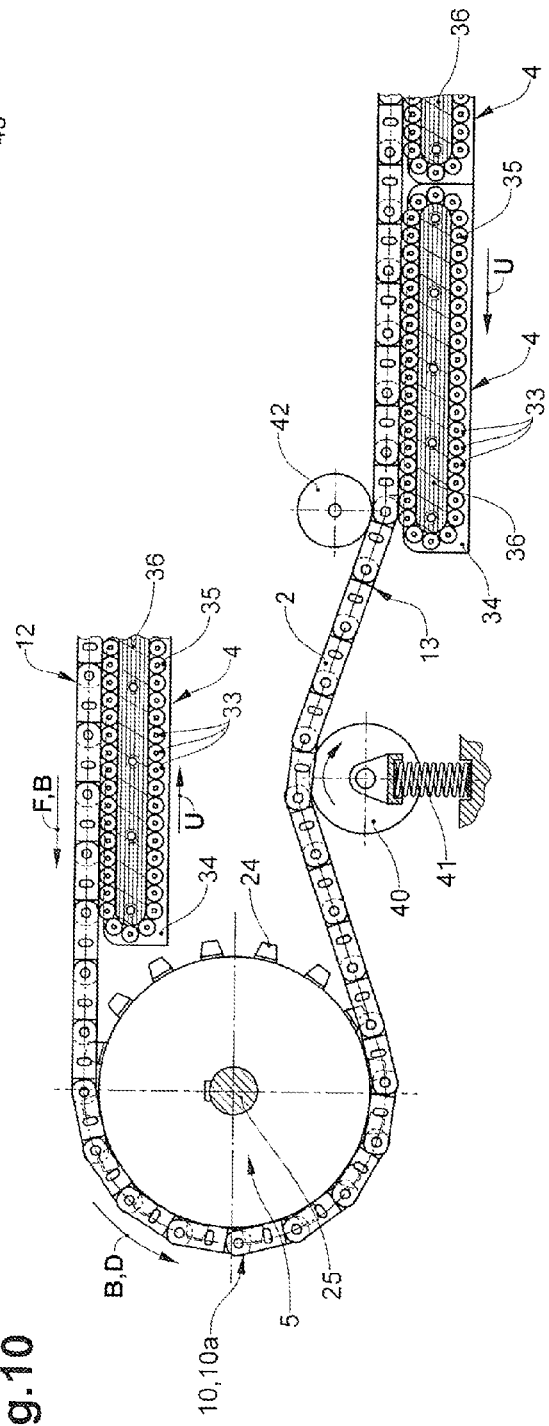

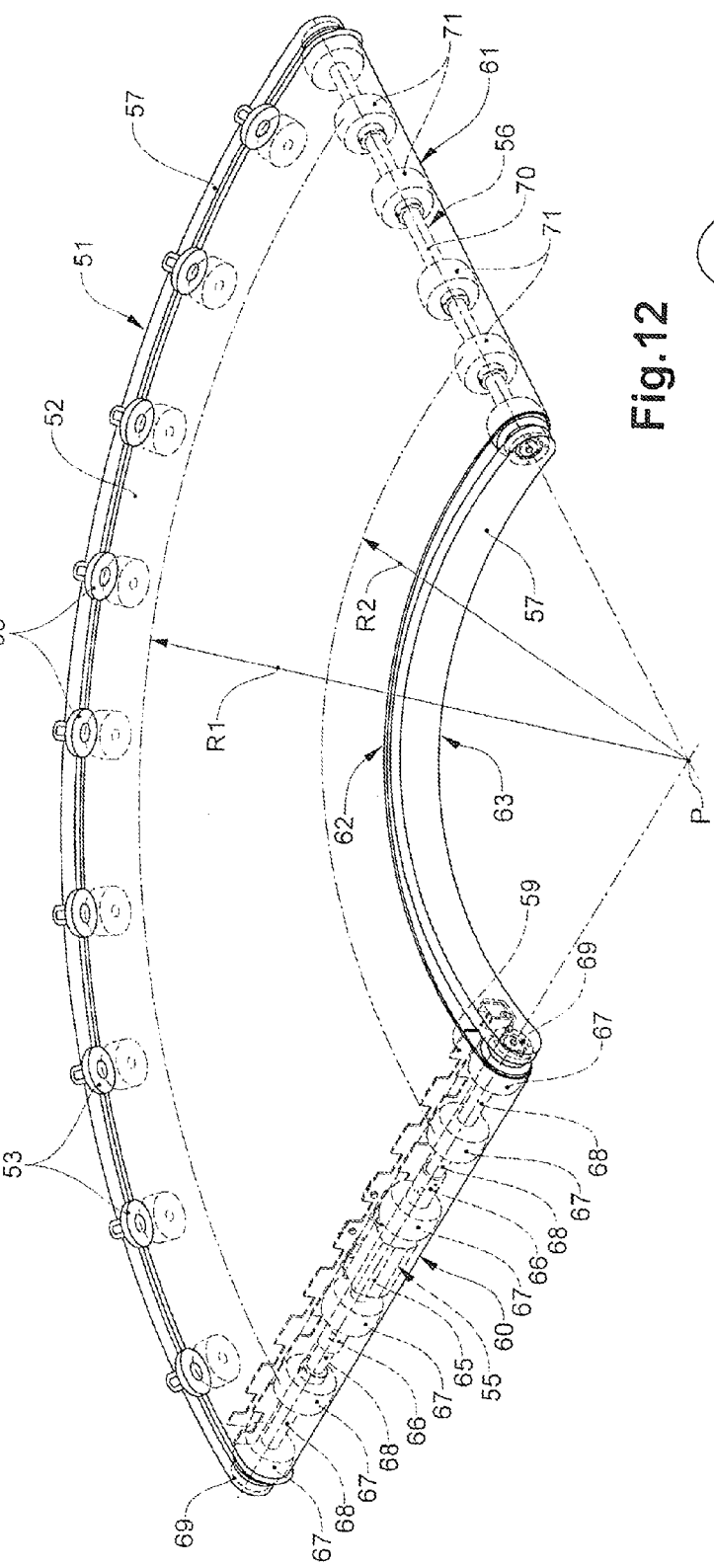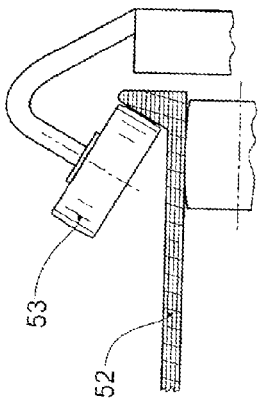

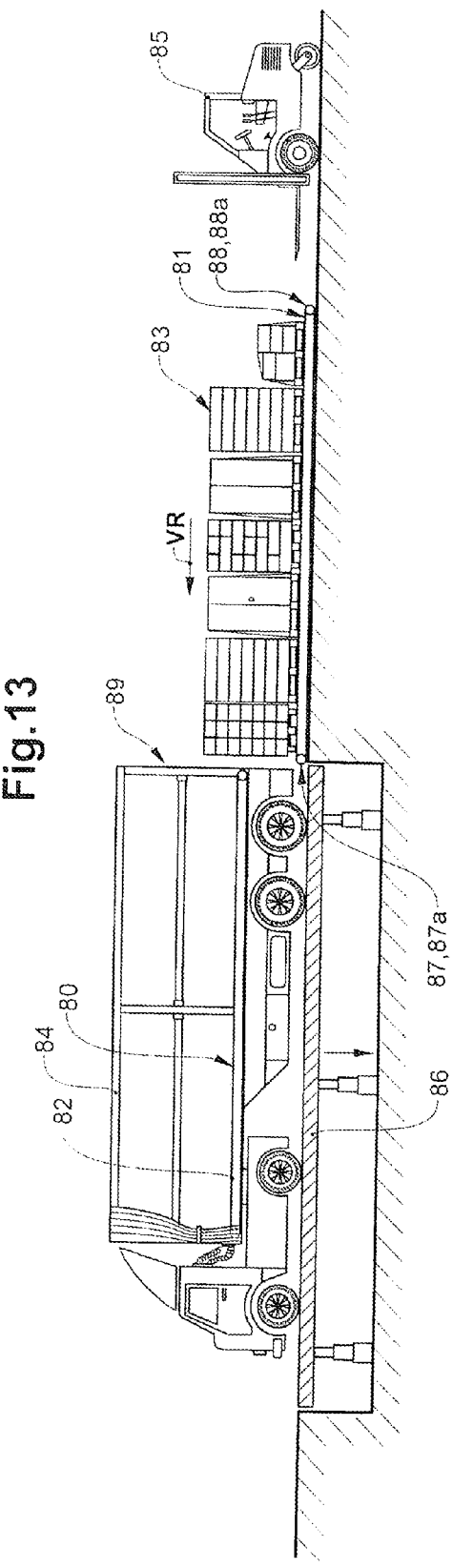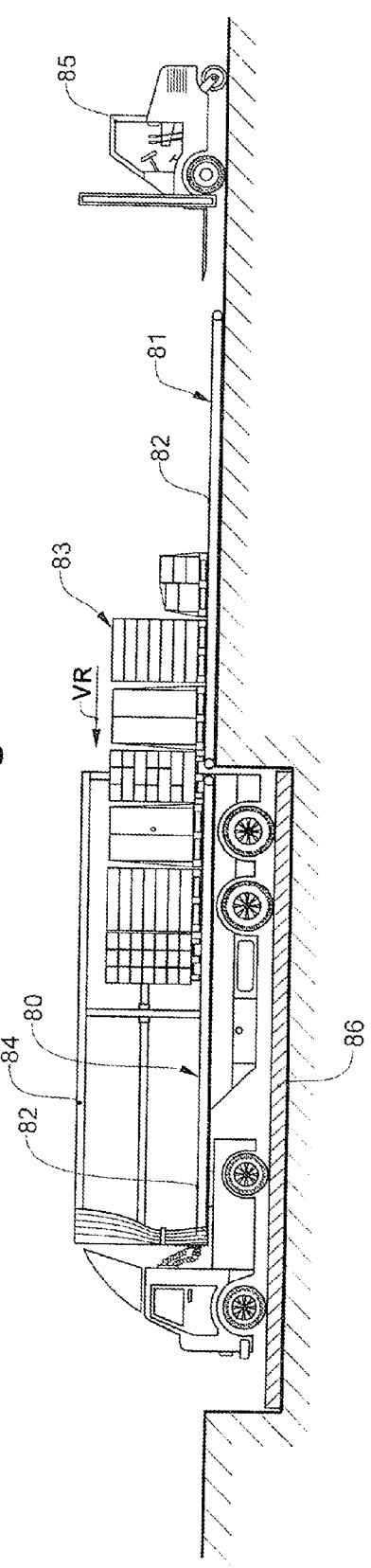

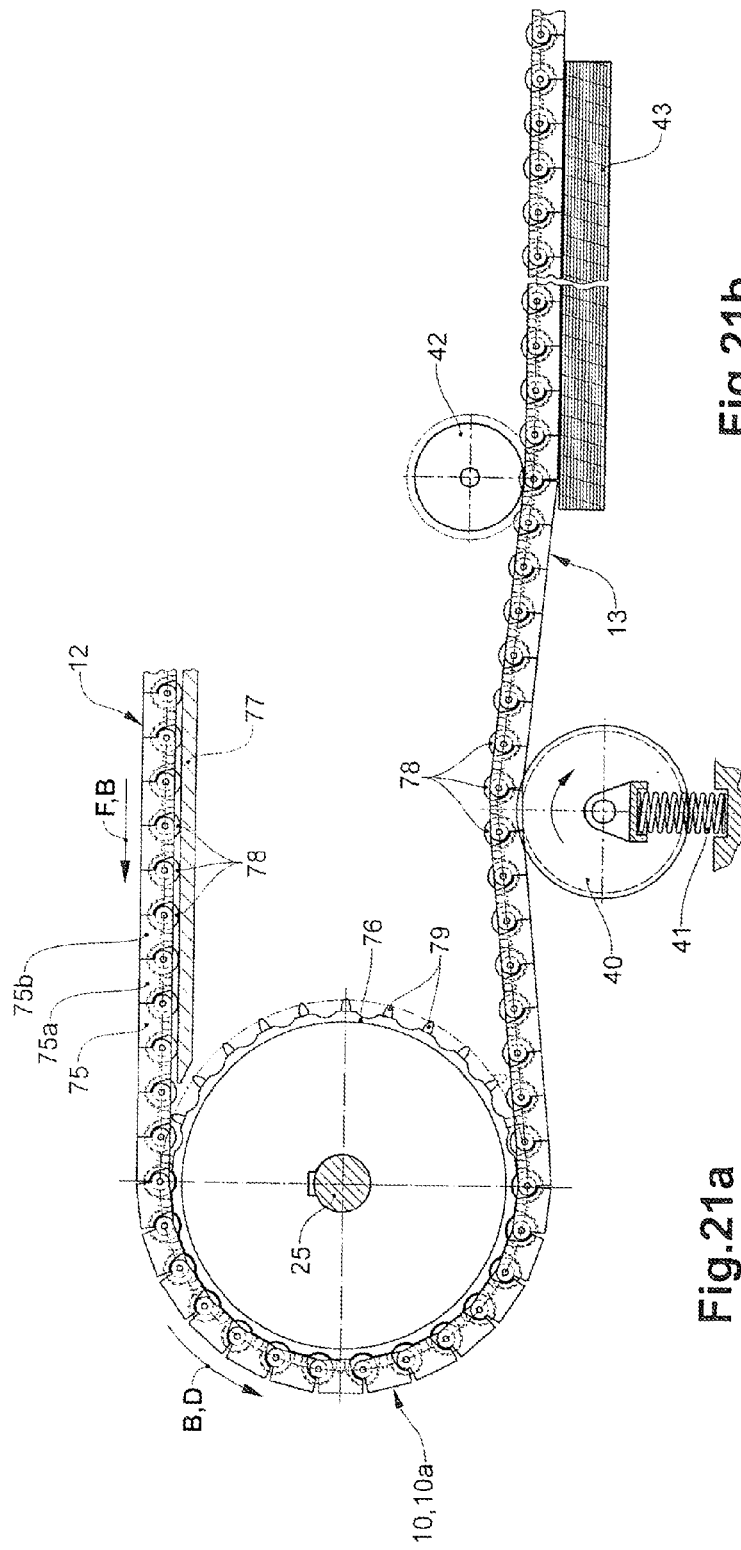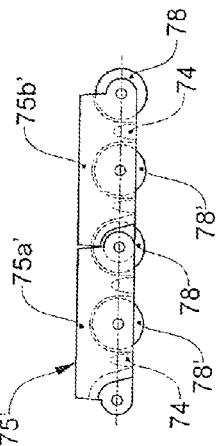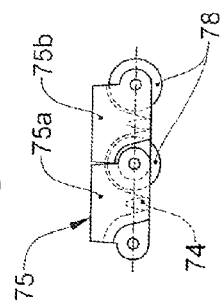

CONVEYING DEVICE WITH A PLANAR CONVEYING ELEMENT

BACKGROUND OF THE INVENTION

1. Field of the Invention

The invention relates to the field of conveying technology and concerns a conveying. The conveying device includes two side limitation devices which are distanced to one another and run parallel to one another in the conveying direction, at least one extensively extended conveying member with an upper run section and a lower run section and which is arranged in a revolving manner between the side limitation devices and is deflected in two head-end regions distanced to one another, a support device with at least one support unit and which is arranged between the side limitation devices, and a drive device with at least one electrical drive motor and with at least one drive shaft coupled to the at least one drive motor and having at least one drive member for the direct drive of the conveying member which at least partly wraps the drive member. The drive device forms a deflection location for the conveying member.

2. Description of Related Art

Conveying devices with a revolving, extensively extended conveying member such as a conveyor belt or mat chain are known in the state of the art. The conveying members as a rule are driven at one or two deflection locations by way of a deflection shaft. These are led in a sliding manner between the deflection locations, e.g. on slide rails, for supporting the conveying members in the region of the upper run section. Conveying devices are also known, with which the conveying member rolls on rolling bodies between the deflections locations. Such a conveying device is disclosed e.g. in WO 2010/148523.

The mentioned conveying devices are applied for example as worker-rider belts. The construction height of such worker-rider belts however should not be too large. Thus today conveying devices are common, which for such specific applications have construction heights of maximal 120 mm to 170 mm, wherein the free height between the base rest and the lower run section of the conveying member is included in this dimension. The comparatively low construction height however represents a challenge with regard to the fashioning and design of the drive device.

DE-C-44 07 163 describes a conveying device of the known type, with a conveyor belt revolving around two deflection shaft-like pivots. The conveyor belt is driven via one of the deflection shaft-like pivots, wherein the drive motor is arranged outside the driven conveyor belt. The defection shaft-like pivot is driven via a gear with a chain drive. It is obvious that the drive units with the drive motor and gear should be arranged between the upper and lower run section of the conveying member as well as between the side limitation devices, since conveying devices of the mentioned type should also be designed in an as compact and space-saving manner as possible.

DE-U-93 16 012 likewise concerns itself with the problem of the limited space between the conveying section and deflection section of the revolvingly led conveyor belt of a conveying device. The conveyor belt in the deflection section wraps a drive wheel. The drive motor is arranged between the upper and the lower run section of the conveying member as well as between the side limitation devices.

For reasons of space, the drive shaft of the drive unit lies at right angles to the rotation axis of the drive wheel. The transmission of torque is effected via a gear with a bevel gear. The conveyor belt between the deflection regions is led in a sliding manner via side cheeks.

DE 1 887 279 describes a conveying device of the known type, with a revolving, extensively extended conveying member which is driven via a deflection shaft-like pivot. The drive motor is arranged between the two deflection regions within the conveying device, wherein the device comprises a gear with drive belts for transmitting the torque from the motor shaft onto the driven deflection shaft-like pivot.

DE 1 060 782 also describes a conveying device of the known type, with a revolving, extensively extended conveying member which is led over two deflection locations which are distanced to one another. The conveying member here in contrast to the solutions described above, is not driven in the region of the deflection, but in the region of the conveying section and return section, via a positive-fit connection in each case to a drive member. The drive members are driven by a drive motor which is arranged between the deflection locations within the conveying device.

DE 10 2006 010 974 describes a conveying device comprising a conveyor belt as well as an essentially horizontal guide frame with two lateral side cheeks extending horizontally in the longitudinal direction of the conveyor belt, at whose ends a deflection roller for the conveyor belt and driveable via a drive is rotatably mounted. The drive is arranged between the two side cheeks.

DE 103 03 195 A1 describes a conveying device for transporting containers in clean rooms, which receive wafers. The transport device comprises two narrow belts which are distanced to one another, arranged adjacent to two side limitation devices and are supported via support rollers attached on the side limitation devices. The drive motor is arranged between the side limitation devices.

The solutions known in the state of the art however have disadvantages. Thus drive units which are arranged within the conveying device, as a rule due to their compelling compact design, do not have enough power to drive conventionally designed conveying devices in a satisfactory manner.

BRIEF SUMMARY OF THE INVENTION

It is therefore the object of the invention, to suggest a conveying device of the initially mentioned type, which overcomes the disadvantages mentioned above. The object is achieved by the features of the independent claim 1. Further preferred embodiments and further developments of the invention are to be deduced from the dependent patent claims.

The object is achieved by way of the conveying device containing rollers for the rolling support of the conveying member, and the drive device within the conveying device being arranged in a head-end region: between a conveying plane formed by the upper run section and a return plane formed by the lower run section, and seen along the conveying direction, between the two head-ends of the conveying member, as well as between the side limitation devices.

The rollers can be provided in the support device and/or in the conveying member.

The drive device can comprise one, two, three or more than three drive motors. The drive motors are preferably arranged one after the other seen in the direction of the rotation axis of the drive shafts. The motor shafts of the drive motors are preferably likewise arranged axially one after the other and form a common rotation axis, in particular also with the drive shafts.

The drive device can comprise one or more drive shafts, wherein the drive shafts are preferably arranged axially one after the other and form a common rotation axis.

The geometric rotation axes of the motor shaft and of the drive shaft or of all motor shafts and drive shafts are preferably arranged in a common plane. This plane for example lies parallel to the conveying pane. The geometric rotation axes of the motor shaft and of the drive shaft or of all motor shafts and drive shafts in particular are arranged congruently to one another. The motor shaft and the drive shaft for this can in particular be arranged coaxially to one another.

The subsequent embodiments in the context of the drive motor, in particular of its motor shaft, can be applied to one two, three or more than three, which is to say all drive motors. Moreover, the subsequent embodiments in the context of the drive shaft can apply to one or more, which is to say all drive shafts.

The head-end regions correspond to the end sections of the conveying member, in which end sections the upper and lower run section are each led via a deflection member into a deflection. The head-ends, as parts of the head-end regions, seen parallel to the conveying direction, correspond to the outermost point of the conveying member in the deflection.

The at least one drive device arranged in the head-end region transmits the drive force via a drive member fastened on the drive shaft, directly onto the conveying member.

The conveying member in the head-end region is preferably deflected about an angle of larger than 135° (angle degrees), in particular by 180° or larger. The deflection in particular effects a reversal of the movement direction of the conveying member.

According to a first embodiment of the invention, the drive motor is designed for picking up a torque from two locations on the drive motor which lie opposite one another and lie in a common axis. The drive motor is coupled via drive output locations in a direct or indirect manner to drive shafts arranged on both sides. The drive motor in particular on both sides comprises motor shaft run sections which lead away from this and which are coupled directly or indirectly to drive shafts arranged on both sides.

The drive shaft can be arranged centrically in the geometric rotation axis of the drive device and be mounted in a rotatable manner. The drive motor can also be a drum motor, wherein the drive shaft in this case is a hollow shaft which is rotatably mounted about a motor shaft-like pivot which is arranged in a rotationally fixed and centric manner in the geometric rotation axis of the drive device. The motor shaft-like pivot is torque-secured. Drum motors are particularly suitable for a frictional drive of conveyor belts. On account of their power spectrum, they are particularly suitable for smaller conveying devices, such as curve conveyors. A shaft-like pivot is hereinafter to be understood as the general term for any shaft-like member, like a beam, shaft, axle or spindle, collectively understood by the obsolete term "arbor".

The drive motor can basically be a synchronous motor, an asynchronous motor or d.c. motor. The drive motor is preferably a brushless d.c. motor (BLDC-motor).

The drive motor preferably comprises a micro-controller for carrying out motor control functions. The drive motor can in particular comprise an electric speed controller for the control of the rotational speed and/or as a dynamic brake (electronic speed control, ESC)

The drive supply voltage and the electronics supply voltage which both preferably are 24 V, are preferably made available via two separate mains parts.

The largest diameter of the drive motor, including the motor housing can for example be 50 to 100 mm, in particular 55 to 70 mm.

The control signals can be sent from the control unit to the drive motor as digital or analog signals. The control signals are preferably digital signals. For this, the drive motor e.g. has a CAN-bus interface which has a signal input and signal output.

According to a preferred further development of the invention, in each case a gear unit is attached on the drive motor on both sides of the drive motor, between the drive shaft and the drive motor and this gear unit takes up the torque from the motor shaft. The gear shafts of the gear units are connected directly or indirectly to the connecting drive shafts.

The gear units can basically be designed as assembly modules. They can, e.g. via screw connections, be flanged onto the drive motor, as the case may be in a coaxial manner. The two gear shafts of the gear units as the case may be are arranged coaxially to the motor shafts and the drive shafts.

It is also possible for the gear or gears to be already integrated in the drive motor and for gear shafts or output shafts to lead away from the drive motor on both sides to the drive shafts. Moreover, it is also possible for the drive motor to be operated as a direct drive in an optimal speed range and therefore no (transmission) gear is necessary.

According to a particular embodiment, means are provided which permit the drive members arranged along the rotation axis of the drive device to be operated at different angular speed. The means such as e.g. transmission gears can be integrated into the drive members. In particular, it is possible for a transmission gear to be assigned to one, more or all drive members. This transmission gear can be integrated directly into the respective drive member. The transmission gear for example is a planetary gear with planet wheels which are arranged around a sun wheel and which are arranged on a planet wheel carrier. The drive member hereby preferably forms a hollow wheel with an inner toothing which cooperates with the planet wheels. Moreover, the hollow wheel preferably has an outer toothing for a positive-fit drive or a drive lateral surface for a friction-fit drive of the conveying member. The planetary gear can be a gear reduction or gear step-up. The planetary gear is preferably driven via the sun wheel.

Preferably, a rotationally elastic and/or flexurally elastic shaft coupling is arranged on both sides of the drive motor, between the drive motor and the respective drive shaft and in particular between a gear unit and the drive shaft. The shaft coupling preferably connects a drive shaft to the gear shaft of the gear unit or to the motor shaft of the drive motor.

The shaft coupling preferably consists of two coupling halves and an elastic intermediate ring, wherein the shaft coupling permits a positive-fit torque transmission. The coupling halves are e.g. designed as claws. Preferably, a shaft coupling of the type TRASCO® is applied. The shaft coupling permits a secure force transmission with a reduction of knocks and rotational oscillations. Moreover, the shaft coupling compensates angular and radial errors and permits small axial displacements. The coupling is also suitable for an operation in two conveying devices, which is to say with opposite rotation directions of the drive shafts.

According to a further embodiment, the drive motor is arranged such that the rotation axis of the motor shaft is at an angle to the rotation axis of the drive shaft of the drive member. The torque here is preferably transmitted from the motor shaft onto the drive shaft via an angular gear. The angular gear can be a bevel gear, a worm gear or a hypoid bevel gear.

The rotation axes of the motor shaft and the gear shaft or drive shaft can enclose an angle of larger than 0° (angle degrees) up to an including 90°. Preferably, they enclose an angle of 90°.

The angular gear can be part of a gear unit which connects onto the drive motor towards the head-end or is integrated into this drive motor.

The motor shaft or driven shaft of the drive motor for this leads into the gear unit. Gear shafts lead on one or both sides at an angle, in particular at a right angle, to the motor shaft or driven shaft, out of the gear unit to the drive members. Gear shafts leading away on both sides usefully run parallel and in particular coaxially to one another. According to this variant, the drive motor is preferably arranged centrally in the drive device and accordingly centrally between the two side limitation devices.

Here too, preferably a rotationally elastic and/or flexurally elastic shaft coupling is arranged between the gear unit and the drive shaft. The shaft coupling connects a drive shaft of the drive member to the gear shaft of the gear unit. The shaft coupling can be designed according to the preceding description.

If the drive device comprises several drive motors, then these are preferably arranged next to one another in a manner such that the rotation axes of the motor shafts run parallel to one another.

The drive member is likewise arranged coaxially to the drive shaft and, as the case may be, also coaxially to the motor shaft. The drive member is preferably a drive roller which is attached on the drive shaft in a rotationally fixed and coaxial manner, or a drive cog. Preferably at least one, preferably at least two drive members are provided in each case on both sides of the drive motor. The drive members are preferably pushed onto the drive shaft and are secured axially as well as rotationally by way of suitable securing means, The drive shafts each with their free end are rotatably mounted on a side imitation device on both sides of the drive device. For this, in each case a bearing unit is attached on the side limitation device, in which bearing unit the free end of the drive shaft is mounted in a freely rotatable, but axially secured manner. The bearing unit is preferably a ball bearing.

The drive device which comprises one or more drive motors, the drive shafts and, as the case may be shaft couplings and one or more gear units, as well as ball bearings, is basically preferably designed as an assembly unit. The assembly unit is preassembled and in the end assembly is installed completely into the conveying device. This is effected by way of the drive device being introduced for example from the top or from the front between the side limitation devices, being brought into position and locked. Accordingly, the drive device can preferably be dismantled again by way of this, after removal of the drive member, being able to be lifted upwards for example, out of the side limitation devices. The drive device is preferably introduced via the lateral ball bearing which is part of the assembly unit, into suitable guides in the side limitation devices. The guides in the side imitation devices can be slide guides.

The side limitation device which e.g. comprises lateral longitudinal profiles can be part of a support frame. The side limitation device in particular laterally embraces the conveying device. The side limitation device together with a head-end limitation device which e.g. comprises transverse profiles can form a carrier frame or support frame.

According to a special further development of the first embodiment of the invention, the drive device has a symmetrical construction, wherein the drive motor is arranged centrally. The gear unit, the shaft coupling, the drive shaft as well as the drive members and finally also the bearing units for the drive shafts and which are provided on the end-side, are arranged symmetrically to one another on the left and right of the drive motor.

The drive motor is fastened preferably directly or indirectly on a transverse component. The transverse component for its part is fastened on both sides on the side limitation device. The transverse component is a longitudinal body and can e.g. be designed as a profile component. The transverse component preferably runs parallel to the rotation axis of the drive device.

According to a particular further development of the first embodiment, the drive motor is arranged laterally on the side limitation device. The drive motor is coupled on the side which is away from the side limitation device, to a single-part or multi-part drive shaft. The drive shaft extends over the width of the conveying member to the oppositely lying side limitation device and is attached on this in a rotatable manner. Basically, a drive motor can be arranged laterally on the side limitation device on both sides and together drive a single-part or multi-part drive shaft lying therebetween. Multi-part means that the drive shaft is composed of several part shafts in the axis direction.

The electric drive motor is preferably driven with a voltage of 24 V. The conveying device therefore preferably comprises a transformer for supplying the drive motor with electric energy. This transforms the electrical current from a mains voltage of e.g. 230 V or 380 V to 24 V.

The transformer is preferably likewise arranged within the conveying device: between the side limitation devices and between a conveying plane formed by the upper run section and a return plane formed by the lower run section, considered along the conveying direction, between the two head-ends of the conveying member.

The transformer can e.g. be arranged between a first deflection device which is designed as a drive device and is at the first head-end, and a further deflection device or drive device at the second head-end e.g. in the region of the support device. The transformer for example is arranged between individual support units. The drive motor for example is arranged between individual support units. The drive motor can however also be fed via a 24 V d.c. voltage.

Moreover, preferably a control unit for the control of the drive motor is also assigned to the conveying device. The control unit is preferably likewise arranged within the conveying device: between the side limitation devices and between a conveying plane formed by the upper run section and a return plane formed by the lower run section as well as, considered along the conveying direction, between the two head-ends of the conveying member.

The control unit can e.g. be arranged between a first deflection device which is designed as a drive device and is at the first head-end, and a further deflection device for drive device at the second head end e.g. in the region of the support device. In particular, the control unit can be arranged in the region of the support device between individual support units. However, one can also envisage the control unit for the drive control being arranged outside the conveying direction.

The control unit preferably comprises a processor as well as advantageously also an electronic data memory.

The control unit can comprise a mains apparatus for the separate supply of the control unit with electrical energy. Thus the control unit can be fed with electrical energy independently of the drive motor. This is particularly important in the start phase, in which the drive motor has a very high energy requirement, so that further consumers which are connected to the same current circuit can only be provided with power to an insufficient extent. The mains apparatus is preferably likewise arranged within the conveying device between side limitation devices and between the upper and lower run section as well as, considered in the conveying direction, between the two head-ends of the conveying member. The mains apparatus in particular can be arranged in the region of the support device between individual support units.

Moreover, a cooling device such as a fan, for cooling the transformer, mains part and/or control unit can be arranged within the conveying device between side limitation devices and between the upper and lower run section as well as, considered in the conveying direction, between the two head-ends of the conveying member. The cooling device can also be designed for leading away the heat from the mentioned devices into aluminium components of the support device.

As already mentioned, the conveying member is deflected at deflection locations at two head-ends which are distanced to one another, from an upper to a lower or from a lower to an upper run section. If the conveying device forms a linear conveying stretch, then the head-ends are for example arranged lying opposite one another. The upper run section forms a conveying section which receives the conveyed goods and the lower run section forms a return section of the conveying member. The deflection and the drive by the drive device according to the invention are effected at least at one of the head-ends.

A drive device according to the invention can likewise be provided at the other head-end, so that the conveying member can be simultaneously or selectively driven at two head-ends.

A conveying device with drive devices at both head-ends can be operated in two conveying directions, specifically in a forwards direction and a backwards direction, wherein in each case that drive device which loads the conveying member with tension in the respective conveying direction drives the conveying member. A conveying device which can be operated in two conveying directions is necessary for example with the storage space conveying devices, loading space conveying devices and loading conveying devices which are described further below.

Conveying members of conveying devices in the form of conveying chains are preferably driven exclusively in tension, since such conveying chains as a rule are not tensioned in contrast to conveyor belts, conveyor bands or conveyor strips. In this case, a drive device is arranged at both head-end regions, so that the conveying chain can also be driven without slip in directions opposite to one another If drive devices are arranged in both head-end regions, then the one drive device which in particular is provided for the drive of the conveying member in the direction opposite to the current conveying direction can be applied for braking the conveying member moved in the conveying direction. In this manner, the conveying member can be stopped in a short time. Suitable means are provided for this.

Moreover, the drive device which is mentioned above and which in particular is provided for the drive of the conveying member in the direction opposite to the current conveying direction, can be applied for braking the conveying member moved in the conveying direction, in order to alleviate or reduce oscillations in the conveying device, in particular in the conveying member. Suitable means are provided for this. The means can in particular envisage a control loop, by way of which occurring oscillations are counter-controlled by way of a targeted braking. By way of this, dynamic oscillation increases of the system can be counteracted.

However, it is also possible to provide only a drive-less defection device in the other head-end region. The deflection device can be a shaft-like pivot with deflection members arranged thereon, e.g. in the form of deflection rollers or deflection cogs. For this, the shaft-like pivot can be mounted on the side limitation device in a freely rotatable manner in one or both directions and/or the deflection members are mounted on the shaft-like pivot in a freely rotatable manner in one or the other directions and this shaft-like pivot can be fastened in a rotationally fixed manner. With the first mentioned variant, the deflection members can be connected to the shaft-like pivot in a rotational fixed manner.

One can further envisage one or more, further drive devices being provided between the two deflection devices on the head-end side. This at least one further drive device comprises an electrical drive motor and a drive shaft coupled to the drive motor. The drive shaft carries at least one drive member, e.g. in the form of a drive roller or a drive cog, for driving the conveying member. The conveying member has at least a tangential drive contact with the drive member. The drive shaft is preferably likewise mounted on the side limitation devices or on components which are attached on the side limitation devices.

The drive device of this intermediate drive can be designed according to one of the previously described embodiments for drive devices.

The support device according to a first preferred design solution is arranged between the two side limitation devices as well as between the two head-end regions. I.e. the support rollers are only arranged between the deflection shaft-like pivots or drive shaft-like pivots of the head-end regions. These are thus not led around the deflection shaft-like pivot or drive shaft-like pivot in the head-end regions.

The rolling bodies or support rollers are preferably not driven directly via the drive. Rather, they are preferably driven indirectly via the conveying member, i.e. are set into a rolling movement.

The drive of the rolling bodies or support rollers is effected in particular by way of the conveyed goods with their weight force loading on the support rollers via the conveying member, i.e. the conveying member pressing against the support rollers.

The support device or the at least one support unit can comprises a plurality of rotatable rollers, on which the conveying member is supported in a rolling manner. The rollers are preferably arranged on support device in a manner distributed over the surface extension of the conveying member. Since the support device is arranged between the two side limitation devices, the rollers are not arranged and fastened on the side limitation devices, but between these.

The rollers according to a first variant are each axially mounted via a physical rotation shaft-like pivot, wherein the rotation shaft-like pivot is arranged in a stationary manner. According to this variant, the rollers are preferably arranged in the stationary support device, wherein the weight load is transmitted via the rotation shaft-like pivots from the rollers onto the support device.

The rollers according to a second variant in each case can be axially mounted via physical rotation shaft-like pivot, wherein the rotation shaft-like pivots are movably arranged in the conveying direction. According to this variant, the rollers are preferably arranged on the conveying member, wherein weight load is transmitted via the rotation shaft-like pivot from the conveying member onto the rollers and via these onto the support device.

The rollers according to a third variant can be arranged in a manner rolling over a support body in a stationary support device, wherein the weight load is transmitted via the lateral surface of the rollers from the conveying member onto the support device. The rollers are amongst other things movable along a stretch parallel to the conveying device.

The support device in a further development of the invention preferably comprises a plurality of support units which are arranged in the surface of the conveying member and on which the conveying member is supported in a rolling manner in the region of the upper run section. The support units can be axially mounted rollers or rollers movable in a rolling manner parallel to the conveying direction, or in each case comprise a rolling body with a plurality of rollers or consist thereof. The rollers or the rolling body are rotatably mounted on the sport device itself or on the support unit or a support body of the support unit.

According to a preferred embodiment of the conveying device according to the invention, the support units in each case comprise a support body as well as a rolling body with a multitude of rollers which are arranged revolving around the support body in a closed circuit. The rollers run with their lateral surface along a closed movement path on the support body. The rollers can be connected to one another into a rolling body via suitable connection means. The connection means can be flexible surface elements, e.g. textile sheet formations. The rollers are not mounted on rotation shaft-like pivots. The resting force of the conveying member acting on the rollers is accordingly not transmitted on rotation shaft-like pivots but via the lateral surface of the rollers, onto the support body.

One can also envisage the support device containing a common base body which forms the support bodies for a plurality of revolving, independent rolling bodies.

Moreover, a co-running belt can be arranged between the conveying member and the rolling body of the support unit and this belt covers the rollers, so that the conveying member rolls indirectly on the rollers via the belt. The conveying member thus rolls on the belt in a manner lying on the rollers. The belt can e.g. be led together with the rollers around a support body. Such a belt is particularly useful in combination with a mat chain: in contrast to a conveyor belt, a mat chain has openings which permit its movement ability, but also a falling-down of dirt on into the rolling body. This problem is counteracted by the mentioned belt.

A conveying device with the described support units is disclosed for example in WO 2010/148523A1.

In a further development of this embodiment, seen in the conveying direction, several support units arranged one after the other in each case with a support body and a rolling body can form a roller track.

The roller track can also however be formed by an individual support unit with a support body and a rolling body of the type described above.

Thus the support device can comprise several roller tracks which are arranged parallel next to one another, each with a plurality of rollers or rolling bodies which are arranged one after the other. The individual roller tracks can for example has a distance to one another of a roller width or of a multiple of this.

Several roller tracks which are arranged in parallel next to one another can form a support module, wherein the conveying device can be formed in variable lengths by an arrangement of several such support modules one after the other in the conveying direction. Such a support module can have a length of 0.5 m to several meters in the conveying direction.

The support units and with them the associated rolling bodies can also be arranged in a tile-like pattern with a lateral offset to one another, in the support device.

The support units can be held by longitudinal beam elements which lie parallel to the conveying direction. The longitudinal beam elements can be supported on a carrier device arranged below. The carrier device can e.g. be a grating which is carried by the side limitation device. Moreover, the longitudinal beam elements are preferably aligned via transverse components. These e.g. are arranged in the head-end region. The longitudinal beam elements can also be (additionally) supported via the transverse components. The transverse components in turn are preferably fastened on the side limitation device. Preferably, the drive motor is also held on the mentioned transverse component as already mentioned, in the region of the drive device.

The longitudinal beam elements can be designed as U-profiles which are open to the upper run section. The support units are placed in the U-profile and are secured in this in a stationary manner. The support units preferably ensure a surfaced support of the conveying member transversely and longitudinally to the conveying direction.

According to an alternative embodiment variant of the invention, the at least one support unit is designed such that the support rollers which revolve around the support body along a revolving track, in an upper revolving track section, in which the support rollers roll in the conveying direction, form a conveying rest for the upper run section of the conveying member, and in a lower revolving track section, in which the support rollers roll in a direction opposite to the conveying direction, form a guide rest for the lower run section of the conveying member. The upper and the lower revolving track section lie opposite one another. A support structure is preferably arranged between the two revolving track sections.

The support rollers can be guided in their upper and lower revolving track section in C-shaped or U-shaped profiles.

According to a further development of the support device, this has an extensively extended support body which serves a support body for a plurality of revolving rolling bodies which are arranged directly or at a distance next to one another and parallel to one another. The rolling bodies at least in sections, in particular on an upper or lower track section, can be led in C-shaped or U-shaped profiles. The support body preferably comprises a support structure arranged between an upper and a lower track section.

According to a second design solution of a support device, with respect to the conveying member, a plurality of stationarily and axially rotatably mounted rollers are attached on the conveying member at its flat side which faces the support device. The rollers are accordingly moved together with the conveying member in the conveying direction. Thereby, they cooperate with the support device by way of them rolling on the support device. The support device for this can form a stationary roller track.

In contrast to rolling bodies which are led in a rolling manner around support bodies, the load here is carried by roller shaft-like pivots. The conveying member however despite this forms a smooth conveying plane towards the conveying surface. This means that the rollers are arranged below the conveying plane and do not project beyond the conveying plane. For this, the conveying member via the rollers forms a closed covering.

The conveying member preferably has a plurality of rollers over the complete longitudinal extension and these rollers are arranged distanced to one another. The individual rollers can extend over the whole width of the conveying member. However, a plurality of rollers which are arranged offset or at the same height next to one another can also be provided over the width of the conveying member.

The rollers, seen in the conveying direction, can for example be arranged in the form of parallel roller tracks arranged next to one another, in each case with a plurality of rollers arranged one after the other. The roller tracks can for example have a distance of one roller width to one another or a multiple of this.

The rollers thus ensure a uniform, rolling support on the support device. The support device for this forms a plane roller surface for the rollers. The support device can further form one or more parallel rows or tracks of rollers arranged one after the other in the conveying direction, also so-called runner rails.

According to this embodiment, the conveying member as described hereinafter is preferably a link chain or a mat chain.

The conveying member and the drive device or their drive members can be designed such that the rollers on the conveying member engage into corresponding recesses of the drive member and thus participate in ensuring the necessary positive-fit connection for transmitting a drive moment from the drive member onto the conveying member.

The extensively extended conveying member can be of one or more parts. The conveying member is characterised in that this forms a rest surface for the conveyed goods. The conveying member is thus in direct contact with the conveyed goods which is conveyed on this.

The conveying member can be a conveyor belt, a conveyor strap or a conveyor strip. The conveying member however is preferably a linked conveying chain with a closed conveying surface in each case of individual chain links connected to one another in an articulated manner. Such a conveying chain can e.g. be an extensively extended link chain, a module belt, a plate chain, a module belt chain or a mat chain. The conveying chain can also be a hinge belt chain or a plate belt chain. The chain links of the conveying chain can consist e.g. of plastic. Such a conveying chain in the embodiment of a mat chain is described for example in the Swiss patent application No. 2011 0649/11.

The use of conveying chains has the advantage that their conveying surface can be loaded to a much greater extent than the conveying surface of conveyor belts, conveyor bands or conveyor strips on account of the comparatively solid design of the chain links. One can convey transport and store heavy goods such as automobiles or lorry loads with the conveying device according to the invention by way of this.

The conveying device can comprise a single conveying member which in this case preferably extends over the whole width between the side limitation devices. The conveying device can however also comprise two, three or generally a plurality of conveying members arranged parallel next to one another. The conveying members can be arranged distanced to one another or directly next to one another.

The plurality of conveying members are however preferably commonly driven via the same drive device(s).

The conveying member in the region of the lower run section, in which no loading due to the conveyed goods is present, can be led and supported in a sliding manner via slide elements. However, it is possible for the conveying member to also be supported and led in a rolling manner, in the region of the lower run section via rollers, in particular via support units with rolling bodies of the type mentioned above.

According to a further development of the invention, the conveying device comprises a deflection member which is assigned to the drive device and which deflects the conveying member in the region of the lower run section towards the drive member, so that the wrapping angle of the conveying member around the at least one drive member is more than 180°.

The conveying device can be applied for conveying bulk objects or piece objects such as resting objects or objects movable by themselves. Piece objects can be goods or living beings, e.g. people animals or plants. The conveying surface formed by the extensively extended conveying member can run in a level or inclined manner. The conveying member can run linearly or arcuately, wherein the curve shape with an inclined conveying surface can be led upwards or downwards in a helical or spiral manner. The conveying device can e.g. be designed as a moving walkway or moving ramp. Moving walkways or moving ramps e.g. are applied in airports, shopping centres or railways stations for transporting people over a longer distance.

The friction is considerably reduced thanks to the rolling support and guiding of the conveying member in the region of the upper run section, by which means lower-powered and smaller drive motors, which meet the same demands on the operation of the conveying device as higher-powered and larger motors applied until now, can be applied for the drive of the conveying member. The motors can thus be designed accordingly smaller and compactor. Gear arrangements which take up much space can be done away with due to the integration of the drive motor into the drive shaft-like pivot of the deflection shaft-like pivot. Moreover, the low power demands also permit the application of drum motors as described further above.

The conveying device can be built in a very compact manner due to the integrated construction manner, with which the drive device as well as the support device are arranged within the revolving conveying member and within the side limitation device. The conveying device in particular has no disturbing contours which are produced by the device components and which lie outside the side limitation device and the conveying member.

Thus the construction height as well as the intrinsic weight can be kept low, which in turn permits an application of the conveying device with restricted spatial conditions. Thus the construction height from the ground up to the conveying surface can e.g. be only 120 mm.

For the reasons mentioned above, the conveying device is also in particular applied as a worker-rider belt. Worker-rider belts are applied in industrial manufacture, in which working steps, such as assembly steps need to be carried out on objects of a manufacturing line which move past. The worker is co-moved on a worker-rider belt parallel to the object in the conveying direction, in order to give the individual worker enough time to carry out his working steps on the object moving past. The worker can be co-moved with the objects e.g. in a speed-synchronous manner.

Such a worker-rider belt can have a length of some meters, e.g. of 20-50 m. An individual worker-rider belt can form a module, wherein much larger conveying stretches can be achieved by way of a series connection and, as the case may be, common control of several such modules.

The conveying device according to the invention can also be applied as a loading space conveying device. The loading space conveying device can e.g. be used in a road vehicle, such as lorry, in a rail vehicle such as freight wagons, in a water vehicle such as a freight ship or in a flight vehicle such as an aeroplane.

Moreover, the loading space conveying device can also be applied for loading and unloading a container in a freight container or ship container. Such containers serve for the transport of goods at on the road, by rail, in the air or at sea and are accordingly transported by road vehicles, rail vehicles, air vehicles or water vehicles.

Moreover, the conveying device according to the invention can also be applied as a storage space conveying device in a storage system, in particular in a high-bay warehouse. The storage system in particular is characterised by a plurality of pallet spaces. The storage system can have a plurality of storage levels arranged above one another. Each storage level in turn has a plurality of pallet spaces which seen in the setting direction are arranged next to one another and/or one after the other.

Each pallet space or several pallet spaces together each comprise the storage space conveying device according to the invention. The stored goods are led on transport pallets by way of transport apparatus such as for lift trucks or lift vehicles, to the pallet spaces, i.e. to the release and removal location in the storage system, are deposited onto the storage space conveying device there and are conveyed via this in the setting direction to the envisaged pallet space.

The fetching of the stored goods is effected in the reverse manner. The platted stored goods are conveyed from their pallet space on the storage space conveying device in the direction of the removal location and received there by a transport apparatus and transported away.

The release location can correspond to the removal location, so that the stored goods are fed into the storage system at the same location and are taken from this in the opposite conveying direction. Such storage systems as a rule function according to the "first in, last out" principle.

The release location and removal location can however also be spatially separated and e.g. lie opposite one another. In this case, the stored goods are released at the release location and taken at the removal location. Such storage systems as a rule function according to the "first in, first out" principle.

The described storage systems serves for storing, which is to say the storage of stored goods or the buffering of goods between two processing steps or transport steps or conveying steps.

A further use of the conveying device according to the invention lies in the field of curve conveyors, with which the transported goods are conveyed around an angle of e.g. 90° (angle degrees). The arcuate track of the conveying member can also be led around an angle of less or more than 90°. If the conveying surface has a gradient, then the arcuate track can even be led helically around an angle of more than 360°. The curve conveyor which can be such as are known from the state of the art can be operated with a conveyor belt or a mat chain. The two head-ends, at which the conveying member is deflected from the upper into the lower run section or vice versa, and at which the drive devices are arranged, are at that angle to one another, by which the transported goods are to be led around a curve. The drive device has a construction according to the invention.

Since the conveying member on the outer arc needs to cover the greater path than on the inner arc, the conveying member runs with a greater speed at the outer arc than at the inner arc. Accordingly, drive members on the outer arc need to have a higher rotational speed than drive members on the inner arc. With drive rollers which drive the drive member by way of a friction fit, the difference can be regulated to a certain extent via the slip. One can also envisage only individual ones of the drive members along the drive shaft being driven and other drive members being designed as freely rotating deflection members, such as rollers or cogs.

If the drive members are e.g. designed as cogs, then speed differences between the conveying member and the drive member can no longer be compensated via the slip. The angular speed of the drive members, starting from a uniform angular speed of the drive shaft in the radial direction to the arcuate path must be adapted to the different track speeds of the conveying member. This can be effected e.g. in the known way and manner by way of the pitch circle diameter of the drive cogs increasing radially from the inner arc to the outer arc of the curve conveyor. Considered at a whole, the cog arrangement has a conical arrangement radially from the inner arc to the outer arc. This embodiment variant however has the disadvantage that the upper run section and the lower run section do not have the same distance to one another transversely to the movement direction of the conveying member.

According to an alternative solution, the drive members arranged along the rotation axis of the drive device, in particular drive cogs are designed with the same pitch circle diameters. However, an individual transmission gear, e.g. a planetary gear is assigned to each drive member and this gear assigns an individual rotational speed to the cog.

The drive members arranged along the rotation axis of the drive device thus rotate at different angular speeds, which increase radially from the inner arc to the outer arc of the curve conveyor.

Basically, a differential gear which transmits different rotational speeds to the individual drive members along the drive shaft can also be provided for achieving the same result. This however is comparatively expensive and is therefore economically of less interest.

The drive devices can further also comprise a braking and/or blocking device. The braking device permits a rapid braking of the conveying member, i.e. with an emergency stop. The blocking device permits the blocking of the one-sided or double-sided freewheel of the stationary drive shaft. In this manner, one prevent the stationary conveying member and the conveyed goods arranged thereon from being able to be set in motion under the effect of an external force, in idle operation The invention further relates to a further aspect of a conveying device, specifically the support device. According to a further object of the invention, independently of the drive device, a support device is to be suggested which is characterised by a reliable, large-surfaced support of the conveying member as well as by a simple construction. The support device in particular should be inexpensively manufacturable with few manufacturing steps, lightweight and robust and torsionally rigid despite this. Moreover, the support device should be constructed a compact manner and in particular have a small construction height. The subsequently described support device or conveying device with the support device can be considered as an independent invention which however indeed can be combined with the invention described above, wherein the support device according to the invention can be considered as an alternative embodiment to the support devices described above.

The conveying device according to this invention likewise comprises: at least one revolving, extensively extended conveying member with an upper run section and a lower run section and which is deflected in two head-end regions distanced to one another, a support device arranged between the two head-end regions, for the support of the upper run section, in particular for the rolling support, and a drive device which is preferably arranged in one of the head-end regions.

This further invention is then characterised in that the support device comprises an extensively extended support body which comprises two surface elements which are held together and are distanced to one another by way of connection profiles arranged between the surface elements. The two surface elements each form an outer-lying, free surface-side. A first surface element with its upper free surface-side faces the conveying member or the upper run section of this. A second surface element with its lower, free surface-side faces the lower run section of the conveying member or the ground base.

Receiver bodies which receive support rollers for supporting the upper run section are attached on the free upper surface-side of the first surface element.

The support body in particular comprises a plurality of connection profiles which are arranged between the surface elements and are preferably aligned parallel to one another. The present invention thereby fulfils the initially mentioned demands, wherein even a construction height of only 80 mm is achieved.

The surface elements are preferably plates or sheets of plastic or metal, in particular aluminium. The surface elements can also be composite plates of several materials such as plastic and metal. The surface elements can be designed in a closed-surfaced manner or can have openings. Thus for example perforated plates or grating elements can be applied.

The connection profiles are longitudinal components of e.g. plastic or preferably of metal such as aluminium. The metal profiles are preferably extruded profiles. The connection profiles can be designed e.g. as C-profiles which is to say U-profiles or I profiles. The connection profiles are preferably bonded to the surface elements over a large area. For this, in particular profile walls are bonded to the surface elements. The connection profiles can also be welded to the surface elements.

The bonding connection can be created by way of a flowing (highly viscous to pasty), curing or drying adhesive, an adhesive strip or an adhesive film.

The receiver bodies are preferably likewise bonded or welded to the first surface element in a large-surfaced manner. The receiver bodies are preferably designed as longitudinal components, in particular as longitudinal profiles or plastic or metal, such as aluminium. The receiver bodies can be designed e.g. as C-profiles or U-profiles. They form a receiver space which points away from the surface element, for rollers arranged one after the other in conveying direction. The rollers are guided in this receiver space in a stationary manner or in a movably rolling manner parallel to the conveying direction.

According to a further development of the invention, the support body also comprises receiver bodies on the lower, free surface side of the second surface element.

The receiver bodies here too form a receiver space for rollers arranged one after the other in the conveying direction and this receiver space faces away from the surface element. The rollers are guided in this receiver space in a stationary manner or in a movably rolling manner parallel to the conveying direction.

According to this further development of the invention, the rollers not only form a support for the upper run section of the conveying member, but also a rolling guide for the lower run section of the conveying member.

According to another further development of the invention, the support body comprises receiver bodies which are arranged between the two surface elements and which form a receiver space for rollers arranged one after the other in the conveying direction. The rollers are led in this receiver space in a movable rolling manner parallel to the conveying direction.

The receiver body according to the mentioned further developments of the invention can be designed as described above and be attached on the surface element.

In a preferred further development of the invention, in each case a receiver body directed to the upper run section and a receiver body which lies therebelow and which in particular is directed to the lower run section, together with connection bodies arranged at the end-side form a revolving track for the support rollers which revolves around the support body. The revolving track is not circular. In contrast, in the support region it preferably forms a linear track section. The support rollers are thus led in a revolving manner around the support body, in the receiver bodies along a revolving track which amongst other things also runs parallel to the conveying direction.

The rollers are not mounted in a stationary manner. The carrying load here is transmitted onto the support body exclusively via the lateral surface of the rollers. The support rollers can be connected to one another into a rolling body by way of a connection element, wherein the e.g. extensively surfaced connection element merely serves as a guide element and receives or transmits no support forces.

The conveying device here too comprises side limitation device which run parallel to the conveying direction and which in particular can be formed by side longitudinal profiles. The two side limitation devices here can also be connected by way of head-end limitation devices, e.g. transverse profiles, into a carrier frame. The support device is then preferably fastened laterally onto the two side limitation devices. For this, the support body between the two surface elements can comprise laterally arranged connection profiles, via which the fastening to the side limitation devices is affected. The support device in particular is arranged within the carrier frame design and is fastened on this. In this manner, the carrying load applied within the side limitation devices onto the conveying member is transmitted outwards onto the side limitation devices or the carrier frame.

The conveying device hereby can comprise a single continuous support device. It is also possible for the conveying device to comprise several support devices of the same or a complementary construction type, which in the conveying direction are arranged next to one another and/or one after the other. The support devices of the described type are preferably designed as an assembly unit.

BRIEF DESCRIPTION OF THE DRAWINGS

The subject-matter of the invention is hereinafter described by way of preferred embodiment examples which are represented in the accompanying drawings. In each case are shown schematically in:

FIG. 7 is a further perspective view of a support device of a conveying device according to the invention, from above;

FIG. 8 is a perspective view of a supporting device of a conveying device according to the invention, from below;

FIG. 9 is an elevation view of a specific embodiment, from the region of the drive device;

FIG. 10 is an elevation view of a further specific embodiment from the region of the drive device;

FIG. 11 is a perspective view of a specific embodiment of the conveying device according to the invention;

FIG. 12 is an elevation view of a side limitation device of a conveying device according to FIG. 11, in detail;

FIGS. 13-14 are elevation views of a first use the conveying device according to the invention;

FIG. 20 is a perspective representation of a further embodiment of a drive device;

FIG. 21a is a lateral view of the conveying member according to the conveying device according to FIG. 20;

FIG. 21b is a lateral view of a second embodiment of a conveying member for use in a conveying device according to FIG. 20;

Basically in the figures, the same parts are provided with the same reference numerals.

DETAILED DESCRIPTION OF THE INVENTION

Figure 1:
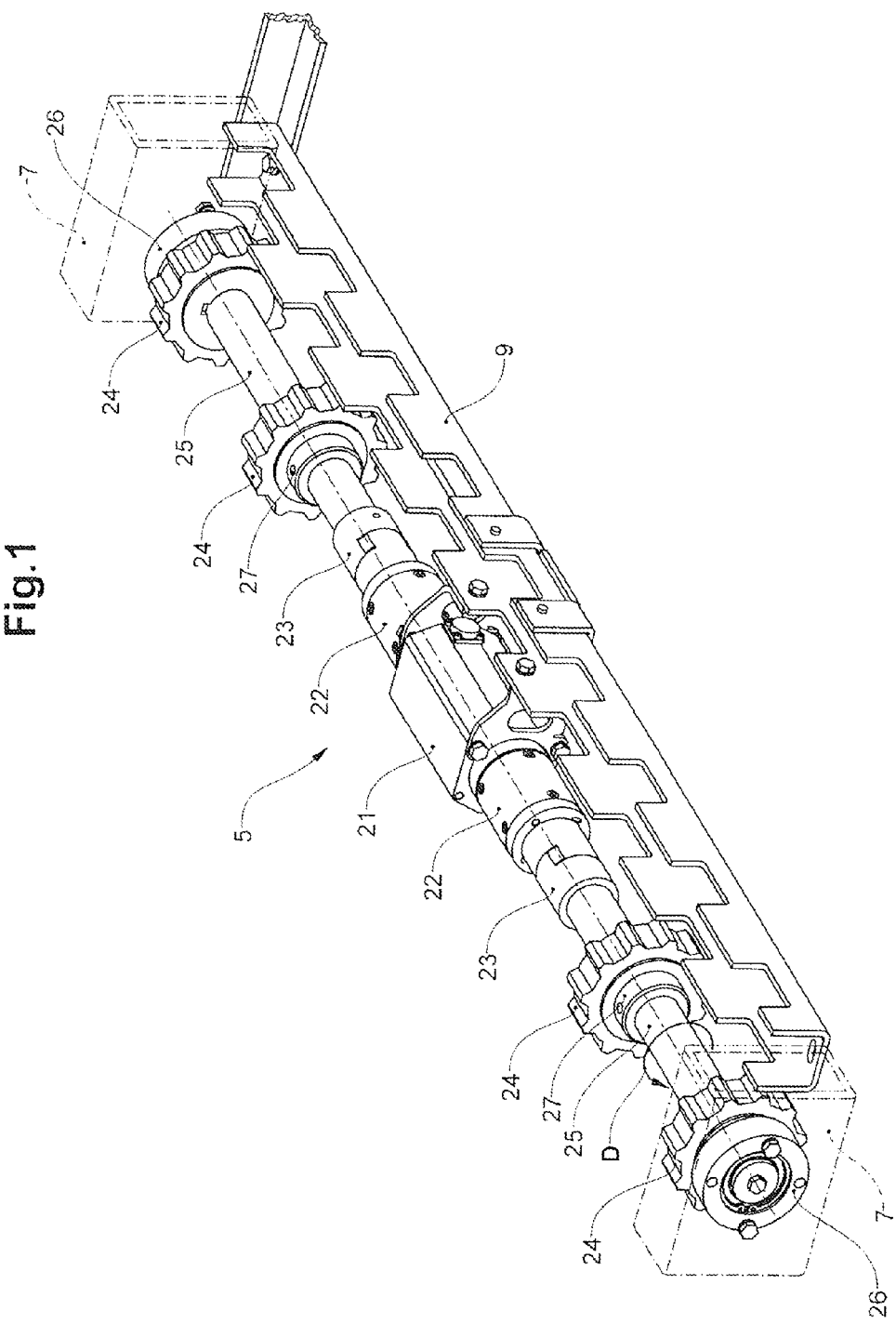
FIG. 1 is a perspective view of a first embodiment of a drive device.
Figure 2:
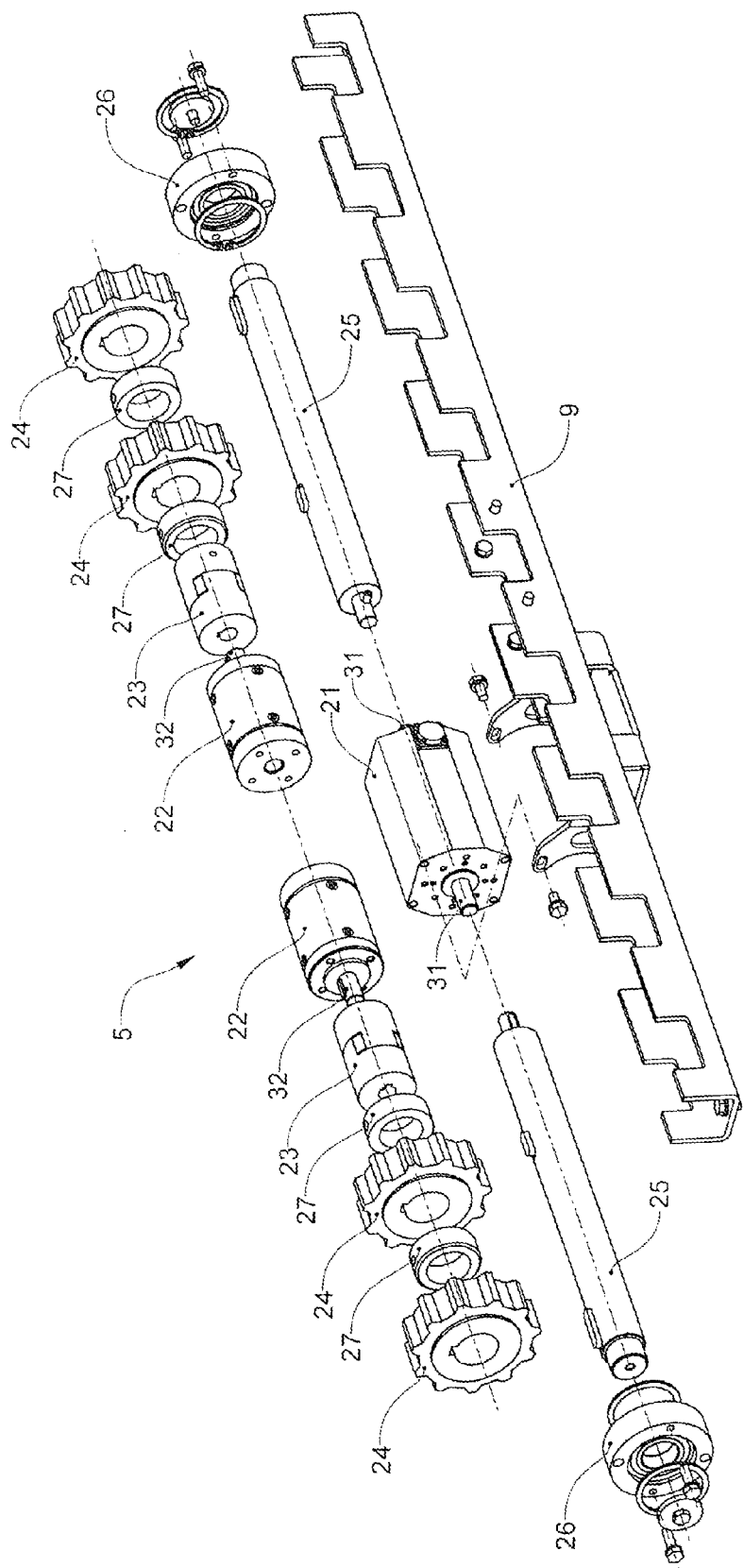
FIG. 2 is an exploded perspective view of the drive device according to FIG. 1.

The embodiment of a drive device 5 according to the invention and which is shown in the FIGS. 1 and 2 comprises a centrally arranged electrical drive motor 21, from which the motor shaft 31 leads away out of the motor housing in two opposite directions. The subsequent description relates to the construction of the drive device 5, departing from the centrally arranged motor, to the periphery. In each case a gear unit 22 is flanged onto the drive motor 21 at both sides of the drive motor 21. In each case a gear shaft 32 leads out of the gear housing from the gear unit 22. In each case a shaft coupling 23 which is connected to the gear shaft 32 in a rotationally fixed manner, connects to the gear shaft 32 on both sides. The shaft coupling 23 in turn is connected to the drive shaft 25 in a rotationally fixed manner. The two drive shafts 25 each receive two drive cogs 24 which are secured on these axially and in a rotationally fixed manner and are distanced to one another. The securing against an axial displacement is effected via securing rings 27. The rotational securing or locking is effected via a positive-fit device of a grooves and cams, which are provided in the circularly cylindrical outer and inner periphery of the components engaging into one another. The drive shafts 25 are rotatably mounted with their end sections in a ball bearing 26. The ball bearings 26 are attached in each case on lateral mounting elements 7. The mounting elements 7 in turn are attached on the respective side limitation device 37.

The construction of the drive device 5 is mirror symmetrical, wherein the plane of symmetry runs centrally through the drive motor 21. Moreover, from the present arrangement, it is also evident that the motor shaft, the gear shaft as well as the drive shaft and the drive cogs are arranged coaxially. The drive device can be designed in a very compact and space-saving manner with this design.

Figure 4:
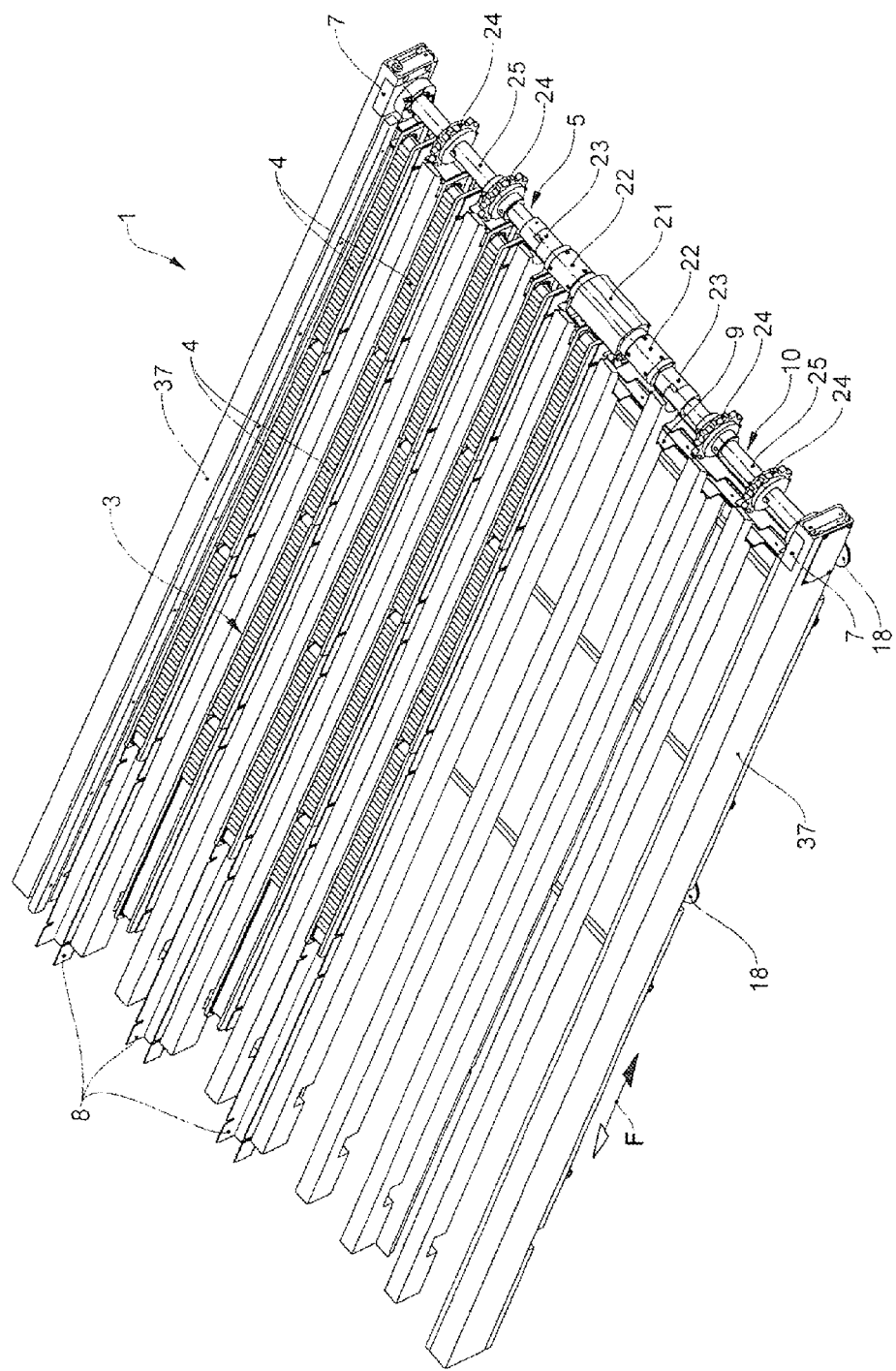
FIG. 4 is a perspective view of the support device of the conveying device according to the invention, from above.

Moreover, a transverse component 9 on which the drive motor 21 is assembled in a stationary manner is provided in the region of the drive device 5. The transverse component 9 is designed as a U-profile. The profile walls have a rectangular crenulated structure. Longitudinal beam elements 8 for receiving support units 4 are introduced into the rectangular recesses of the profile walls (see also FIG. 4). The transverse component 9 hereby does not serve or not only serves for the support of the longitudinal beam elements 8, but also for the alignment of these transversely to the conveying direction F.

Figure 22:
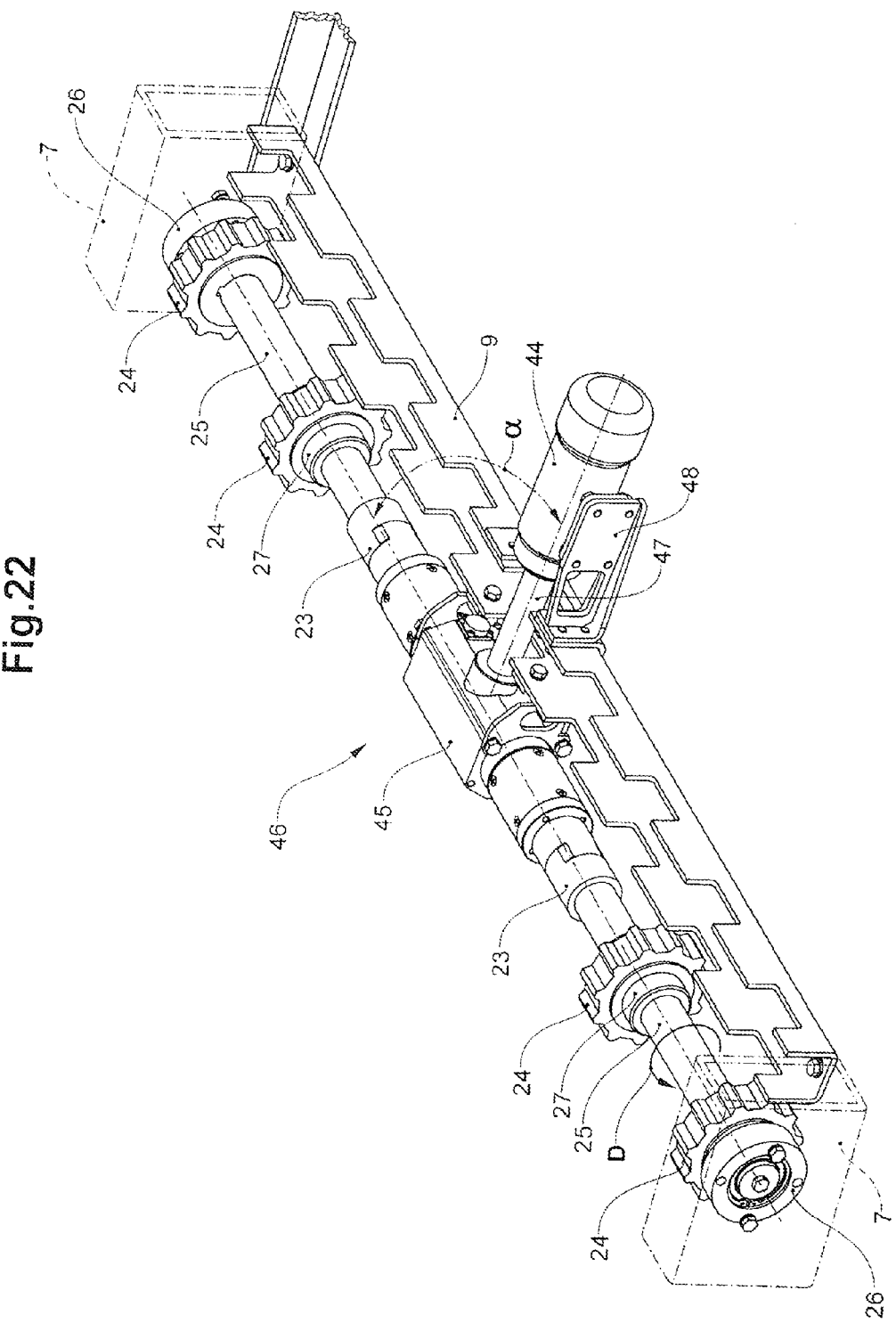
FIG. 22 is a perspective view of a further embodiment of a drive device.

The drive device 46 according to FIG. 22 differs from the drive device 5 according to FIG. 1 only in the design of the drive motor and in the fastening of this on the conveying device as well as in the associated gear unit. With regard to the remaining features, the embodiment according to FIG. 22 corresponds to the embodiment according to FIGS. 1 and 2, which is why at this location and with respect to this, the description of the mentioned features in the context of FIGS. 1 and 2 is referred to. The features concerned therefore have the same reference numerals in FIG. 22 as in FIGS. 1 and 2.

The electrical drive motor 44 according to FIG. 22 is likewise arranged centrally. In contrast to FIG. 1 however, this is arranged set back transversely to the drive shaft 25 and in the direction of the opposite, second head-end. The motor shaft encloses an angle α of 90° with the drive shaft 25 or the gear shaft of the gear unit 45.

The drive moment is transmitted by the drive motor 44 onto an output shaft 47 which is led coaxially to the motor shaft and which is turn is led into a gear unit 45. The gear unit 45 has an angle gear, via which the drive moment supplied by the output shaft 47 is introduced into the drive shaft 25 lying at a right angle to the output shaft 47.

A gear shaft led coaxially to the drive shaft 25 leads out of the gear housing from the gear unit 45 in each case to both sides (not shown in FIG. 22). A shaft coupling 23 connects to the gear shaft at both sides and is connected to the gear shaft in a rotationally fixed manner. The shaft coupling 23 in turn is connected to the drive shaft 25 in a rotationally fixed manner The drive motor 44 is assembled on a transverse component 9 in a stationary manner via a holder 48. Further details with regard to the transverse components 9 are likewise to be deduced from the description with regard to FIGS. 1 and 2.

The drive devices 5, 46 according to FIGS. 1, 2 and 22 are preferably attached in a first head-end region 10 of the conveying device 1 which at the same time is a deflection location.

Figure 3:
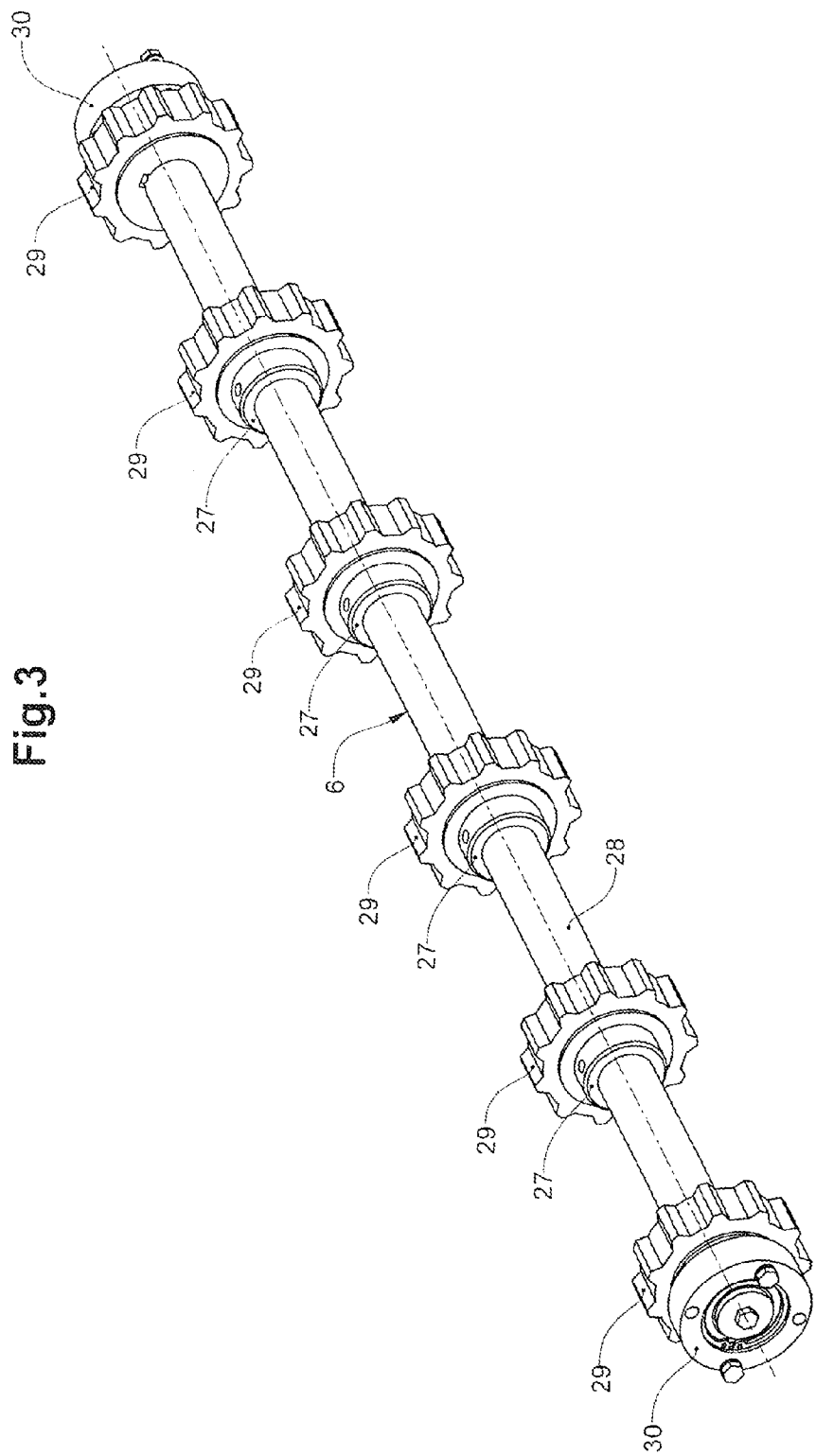
FIG. 3 is a perspective view of a deflection device.
Figure 5:
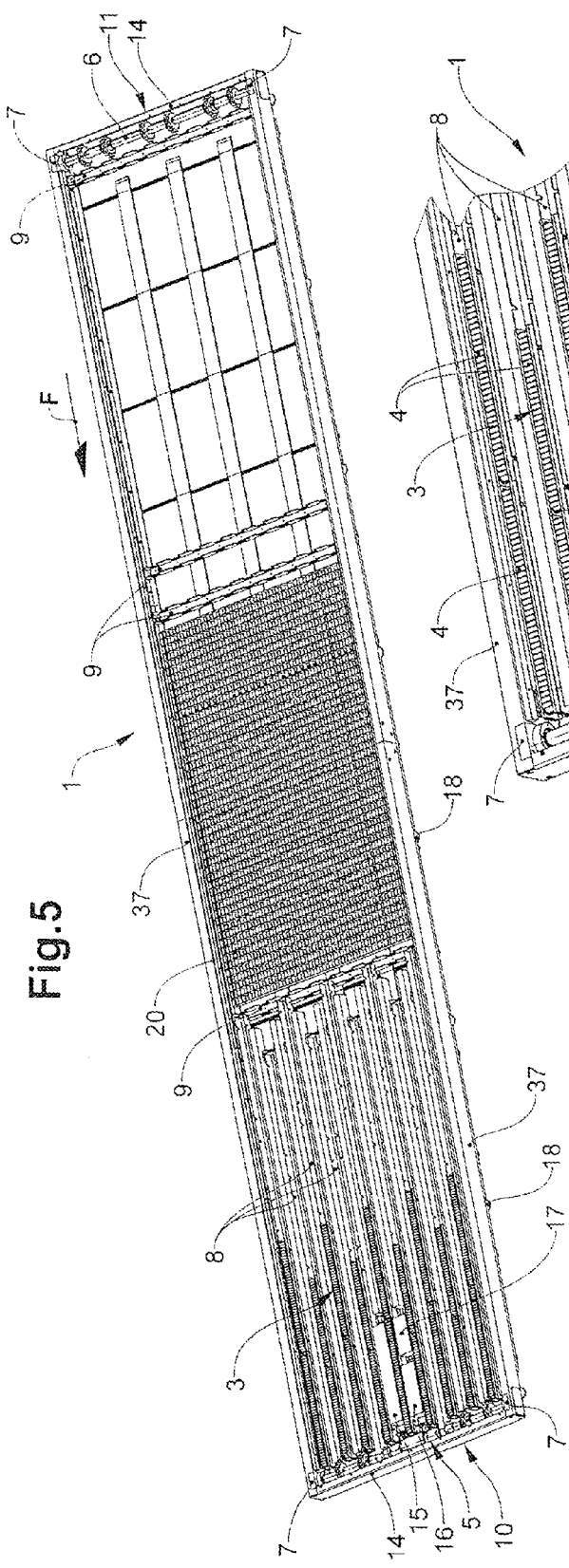
FIG. 5 is a further perspective view of a support device of a conveying device according to the invention, from above.
Figure 6:
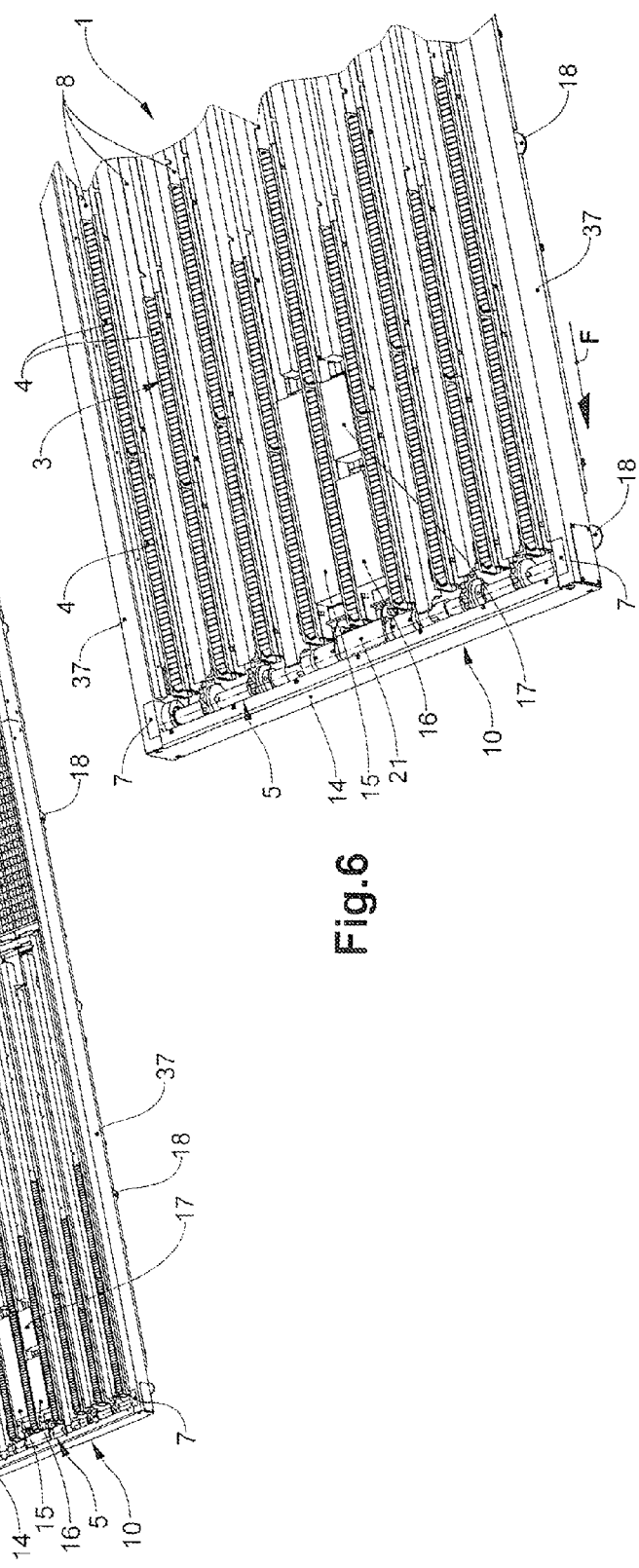
FIG. 6 is an enlarged detail perspective view from the region of the drive device.

A non-driven deflection device 6 for example is provided at the opposite second head-end region 11 of the conveying device 1 (see FIGS. 3 and 5).

The deflection device (see FIG. 3) comprises a deflection shaft-like pivot 28 which via a ball bearing 30 is rotatably mounted on the frame or the side limitation device 37 of the conveying device 1. Deflection cogs 29 which are secured against an axial displacement via securing rings 27 are arranged on the deflection shaft-like pivot 28 at regular distances to one another. One can also envisage the drive members being distanced to one another or secured against axial displacement via spacer sleeves.

FIGS. 4 to 8 show details of a conveying device 1 according to the invention, in different perspective views. For the purpose of a better overview, the conveying member which is preferably a mat chain is not represented in these representations. The conveying device 1 in a first head-end region 10 comprises a drive device 5 of the type described in FIGS. 1 and 2. The drive device 5 or its drive shaft 25 is connected via ball bearings 26 to the side limitation devices 37 designed as lateral longitudinal profiles. At this point, a repeated description of the drive device represented in FIGS. 4 to 8 is therefore omitted. Moreover, for the sake of a better overview, not all reference numerals with regard to the drive device 5 have been specified again in the FIGS. 4 to 8.

The conveying device 1 comprises two side limitation devices, also called lateral longitudinal limitation devices, in the form of lateral longitudinal profiles 37 which run parallel to the conveying direction F. The lateral longitudinal profiles 37 in the two head-end regions 10, 11 are joined together with a head-end limitation device in the form of transverse profiles 14, into a carrier frame. This however with regard to the drawing is only evident from the FIGS. 5 to 7. The transverse profile 14 in the head-end region is not represented in FIG. 4.

Support or levelling feet 18, via which the conveying device 1 is supported on the ground or an underlay, are attached on the lateral longitudinal profiles 37 towards the ground.

The conveying device 1 has a support device 3 arranged between the lateral longitudinal profiles 37. The support device 3 comprises a plurality of longitudinal beam elements 8 which run in the conveying direction and parallel to the lateral longitudinal profiles 37 and which are designed as U-profiles which are open upwards to the upper run section. The U-profiles 8 as already mentioned are introduced with their end sections into recesses in the profile walls of the head-side transverse profiles 9 and via these are aligned transversely to the conveying direction F. Of course, yet further transverse profiles 9 of the described type can be provided between the head-end regions 10, 11 in the support region, so that the longitudinal beam elements 8 are yet additionally guided and/or supported.

Support units 4 are inserted into the U-shaped recesses of the longitudinal beam elements 8 and are secured therein against a displacement in the conveying direction F. The longitudinal beam elements 8 in their side walls comprise securing slots, through which securing means are led and can be connected to the support units 4. A plurality of support elements 4 can be arranged one after the other in a longitudinal beam element 8 which are led e.g. up to the respective head-end regions 10, 11. The arrangement of support units 4 placed one after the other runs parallel to the conveying direction F. Now a plurality of such rows of support units 4 which run parallel to one another and in the conveying direction F, are provided transversely to the conveying direction F. These are arranged in suitable longitudinal beam elements 8 which are arranged parallel to one another and are distanced to one another. The distance of the longitudinal beam elements 8 and accordingly of the support elements 4 to one another is freely selectable. The support elements 4 of adjacent rows can be arranged offset to one another along the conveying direction.

The described arrangement ensures a surface-covering rolling support of the conveying member 2 which however is not continuous transversely to the conveying direction. A continuous, rolling support transversely to the conveying direction F however is not absolutely necessary, since the conveying member 2 and in particular the links of mat chains have a certain intrinsic stiffness.

A grating 20 (see FIG. 5) is arranged below the longitudinal beam elements 8 and assumes a carrying or supporting function for the longitudinal beam elements 8. The lower run section 13 of the conveying member 2 is led through below the grating 20.

The conveying device also comprises a transformer 15 for transforming a mains voltage into a drive supply voltage, a control unit 17 for control of the drive device 5 as well as a mains apparatus 16 for the electronics supply voltage of the control unit 17. The three construction units are arranged in each case between two support units 4 or between two longitudinal beam elements 8 and between the upper and lower run section 12, 13 of the conveying device 1 as well as between the two head-ends 10a, 11a.

FIGS. 9 and 10 show a mat chain 2 which is led around the drive cogs 24 of the drive device 5. The mat chain 2 moves along the movement direction B which in the upper run section corresponds to the conveying device F. The movement direction B of the mat chain corresponds to the rotation direction D of the drive shaft 25, in the region of the deflection on the drive device 5, which is to say in the region of the wrapping with the drive cogs 24. The rotation direction D of the drive shaft 25 is selected such that the drive device 5 pulls the upper run section 12 with the conveyed goods placed thereon. The drive device 5 can however also be designed for a reverse operation, with which the conveying member can also be moved in the opposite direction. Accordingly, an opposite rotation direction of the drive shaft 25 is also possible. This drive configuration is not limited to the present embodiment example but can be applied very generally in the invention.

The teeth of the drive cogs 24 engage with a positive-fit into corresponding recesses in the mat chain 2 and thus permit a force transmission by way of a positive-fit. The wrapping angle is about 180°, by which means the upper and the lower run section 12, 13 come to lie in a parallel guidance relative to one another. If the drive members are designed as drive rollers, then the force transmission is effected via a fiction fit (not shown). This however necessitates a sufficient pressing of the drive member onto the drive rollers.

Moreover, one can deduce from FIGS. 9 and 10 as to how the mat chain 2 is supported in a rolling manner in the region of the upper run section 12, by way of the rolling body 35 of the support unit 4. The support unit 4 comprises the already mentioned rolling body 35. This comprises a plurality of individual rollers 33 which are revolvingly led around a support body 36. The rollers 33 are guided in a manner distanced to one another via a connection means. The resting forces of the mat chain 2 are in fact transmitted via the roll surface of the rollers 33 onto the support body 36. The support unit 4 moreover comprises side guide elements 34 which prevent the rollers 33 from laterally slipping from the support body 36. The support units 4 are of course arranged in the conveying device 1 such that their revolving track U runs in the contact region of the conveying member 2 parallel to the conveying direction F.

In the embodiment example according to FIG. 10, the mat chain 2 is also supported in the region of the lower run section 13 via the support units 4 described above. This however is not absolutely necessary. Thus the lower run section 13 according to FIG. 9 is supported via slide guides 43.

Of course, two or more conveying devices 1 can be arranged one after the other into an overriding conveying installation, wherein in each case a first head-end region of a first conveying device meets a second head-end region of a second conveying device (not shown). The conveying installation can be a conveyor line. The drive devices of the conveying devices can be connected to one another with regard to control technology and driven via a central control device.

With this, the individual conveying devices of the conveying installation can be driven in a coordinated and in particular synchronous manner.

A deflection member 40 in the embodiment of a spring-loaded deflection roller is assigned to the drive device 5 in both embodiment examples according to FIGS. 9 and 10. The deflection roller 40 is arranged between the drive device 5 and the opposite deflection device. In the region of the driven, first head-end region 10, it is pressed via compression springs 41 towards the lower run section 13, wherein the lower run section 13 is pressed in the direction of the upper run section 12. By way of this, the wrapping angle around the drive cog or drive cogs 24 is increased, e.g. by 5 to 30° (angle degrees). The larger the wrapping angle, the more secure or reliable is the force transmission from the drive device onto the mat chain 2.

A guide roller 42 which deflects the lower run section 13 to the guide is arranged subsequently to the deflection member 40 in the direction of the return of the lower run section.

The guide as mentioned is a slide-guide 43 or a roller-supported guide.

FIGS. 20, 21a and 21b show a further embodiment of a mat chain 75 which is led around a drive cog 76 of a drive device. The mat chain 75 moves along the movement direction B which in the upper run section corresponds to the conveying direction F. The upper run section 12 of the mat chain 75 is supported via a support device 77.

In the region of the deflection on the drive device, which is to say in the region of the wrapping with the drive cog 76, the movement direction B of the mat chain corresponds to the rotation direction D of the drive shaft 25. The rotation direction D of the drive shaft 25 is selected such that the drive device pulls the upper run section 12 with the conveyed goods placed thereon.

In contrast to the embodiment according to FIGS. 9 and 10, a plurality of support rollers 78 which are stationary with respect to the mat chain 75, 75' and are mounted in an axially rotatable manner are attached on the mat chain 75, 75' on the flat side which faces the support device 77.

The support rollers 78 together with the mat chain 75, 75' are moved in the conveying direction F. Thereby, they cooperate with the support device 77 by way of these rolling on this. The mat chain 75, 75' comprises a plurality of support rollers 78 which are arranged distanced to one another over the complete length of the mat chain 75, 75' and thus ensure a uniform rolling support on the support device 77, for a large-surfaced or extensive support. The support rollers 75, 75' extend over the whole width of the mat chain 75. The support device 77 for this forms a plane rolling surface for the rollers.

Support rollers 78 are attached in each case on the connection locations of two mat chain links 74a, 74a'; 74b, 74b', wherein the rotation shaft-like pivots of the support rollers 78 and the connection shaft-like pivots of the mat chain links 74a, 74a'; 74b, 74b' are each designed together.

According to a further development of this embodiment, the mat chain 75' between the connection shaft-like pivots in each case may comprise further support rollers 78' with additional rotation shaft-like pivots. I.e. additional support rollers 78' can be arranged on the individual mat chain links 74a', 74b' (FIG. 21b).

The drive cog 76 is designed such that the support rollers 78, 78' on the mat chain 75, 75' engage into corresponding recesses on the drive cog 76. Moreover, the drive cog 76 comprises teeth 79 which engage into corresponding recesses 74 on the side of the mat chain 75, 75' which faces this drive cog. The positive-fit connection necessary for the transmission of a drive moment from the drive cog 76 onto the mat chain 75, 75' is created in this manner.

Moreover, a deflection member 40 in the design of a spring-loaded deflection roller is assigned to the drive device according to FIG. 20, analogously to the embodiment according to FIG. 9. The deflection roller 40 is arranged between the drive device and the opposite deflection device. In the region of the driven first head-end region 10, it is pressed via a compression spring 41 to the lower run section 13, wherein the lower run section 13 is pressed in the direction of the upper run section 12. The wrapping angle around the drive cog 76 is enlarged by way of this.

A guide roller 2 which deflects the lower run section 13 to a slide-guide 43 is arranged subsequently to the deflection member 40 in the direction of the return of the lower run section. The lower run section 13 of the mat chain 75, 75' is subsequently supported to the bottom via the slide-guides 43. The description with regard to FIG. 9 is referred to with for this.

FIGS. 11 and 12 show a further embodiment of the conveying device 51 according to the invention. This in the present example is designed as a curve conveyor, by way of which the conveyed goods can be conveyed around a curve. The curve conveyor 51 is e.g. combined with linearly conveying conveying devices of the previously described type, into a conveying installation. The curve conveyor 51 in the present embodiment example forms a conveying angle of 90°. I.e. the conveying direction of the conveyed goods coming from the first head-end region 60 is deflected by 90° to the second head-end region 61.

The mentioned conveying device 51 likewise has a first head-end region 60 with a drive device 55, and a second head-end region 61 which is at a right angle to this and which has a deflection device 56. The conveying member 52 which here is a conveyor belt led at a right angle, is deflected into the two head-end regions 60, 61 and thus forms an upper run section 62 with a conveying section, and a lower run section 63 with a return section. The upper run section is supported between the head-end regions 60, 61 to the bottom, likewise via a support device.

The conveying member 52 is led along a circular track which is defined by a circle centre P. The drive members 67 are then arranged at different radial distances R1, R2 to the circle centre along the rotation axis of the drive device 55. The rotation axis of the drive device 55 is aligned radially to the circle centre P. The conveying member 52 then moves on the outer arc at a higher speed around the deflection in the head-end region, than in the inner arc. Accordingly, the drive member 67 arranged at the greater radial distance R1 in conveying operation rotates at a higher angular speed ω1 than the drive member at the smaller radial distance R2 and operated with the angular speed ω2 (see also FIGS. 18 and 19).

The drive device 55 is likewise constructed in a mirror-symmetrical manner and comprises a centrally arranged electric drive motor 65. In each case, a shaft coupling 66 is arranged on both sides of the drive device. The gear in contrast to the embodiment according to FIGS. 1 and 2 is either integrated in the drive motor 65 or no such one is provided. The drive motor 65 on both sides is connected to a drive shaft 68, on which a plurality of drive rollers 67 are applied in a rotationally and axially secured manner. The drive of the conveyor belt 52 is effected via a friction fit. The drive shaft 68 at its free end is mounted in a rotatable manner on a side limitation device 57 via ball bearings. The drive motor 65 is likewise fastened on a transverse component which for its part is connected to the side limitation device 57.

The deflection device comprises a deflection shaft-like pivot 70 which with its free end-sections are rotatably mounted in a side limitation device 57 via ball bearings. A plurality of deflection rollers 71 are applied on the deflection shaft-like pivot 70 in an axially secured manner.

The conveyor belt 52 at its outer arc is led over guiding and pressing rollers 53. The guiding rollers 53 press the conveyor belt 52 in the direction of the support device and simultaneously tension it radially outwards. The conveyor belt 52 would otherwise arch in the outer arc by way of the guiding.

FIGS. 13 and 14 represent a first possible application of the conveying device 80, 81 according to the invention, in the field of loading goods, in particular palleted goods, on railed vehicles or road vehicles, such as lorries. The conveying devices 80, 81 likewise have a revolving mat chain 82 or conveyor belt which is or are deflected in two head-end regions 87, 88 which are opposite to one another. The application envisages a first conveying device 81 as a loading conveying device. This is positioned on a loading ramp. The first head-end region 87 of the loading conveying device 81 is directed to a transport vehicle 84 and ends preferably directly in front of a loading opening 89 of the transport vehicle 84. The second, oppositely lying head-end region 88 is directed to a feeder side or loader side, on which the transported goods 83, e.g. palleted transported goods are fed and transferred to the loading conveying device 81 by way of lifting and conveying means, such as e.g. by way of a fork-lift truck according to FIGS. 13 and 14. The transported goods 83 are conveyed via the loading conveying device 81 to the loading opening 89 of the transport vehicle 84.

A further conveying device 80 according to the invention and which is designed as a loading space conveying device is arranged on the loading surface of the transport vehicle 84. The loading space can be designed as an open or closed loading space. The loading space conveying device 80 at the loading opening 89 takes the conveyed goods 83 fed by the loading conveying device 81 and conveys these along the loading surface into the loading space.

Since the drive device of the conveying device 80 is operated with a voltage of 24 V, the loading space conveying device can be connected directly to the vehicle mains, which with motor vehicles as a rule is likewise operated at 24 V. No retrofitting is necessary for this.

As is known from the state of the art, the loading surface of the transport vehicle 84 is brought to the level of the loading ramp, or the conveying surfaces of the two conveying devices 80, 81 are brought to the same level, for loading the conveyed goods 83. For this, the transport vehicle can be lifted and lowered via a hoist 86.

The loading space conveying device 80 as well as the loading conveying device 81 has a drive device 3 according to the invention in both head-end regions 87, 88. In this manner, the mat chain 82 can be operated in a forward and backwards direction.

The loading space conveying device can also be applied in a container, such as a freight container or ship container for loading and unloading the container.

Figure 15:
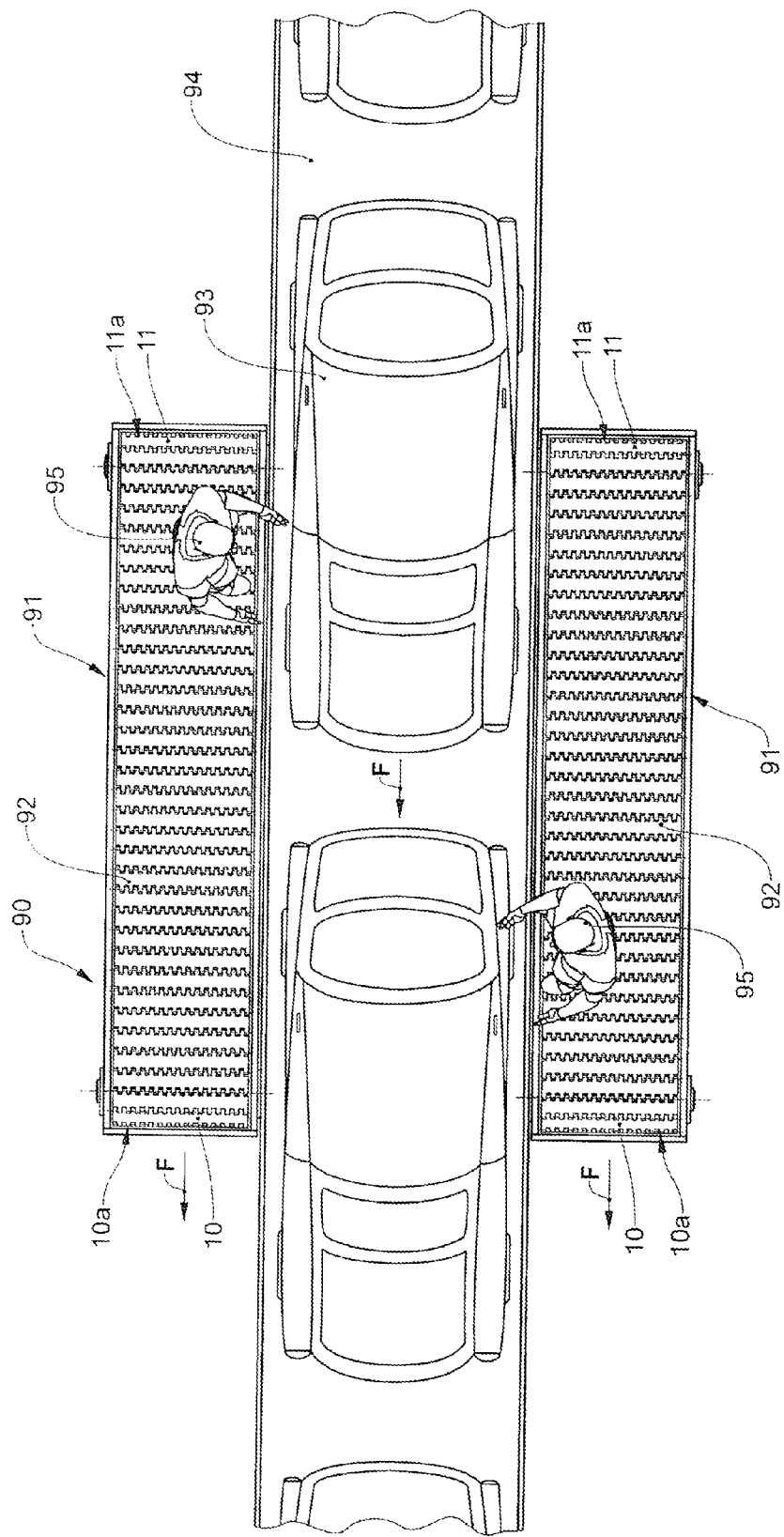
FIG. 15 is a plan view of a further use of the conveying device according to the invention.

FIG. 15 represents a further important application of the conveying device 91 according to the invention, as a worker-rider belt. FIG. 15 shows an assembly line 90 for cars or automobiles. Of course, with regard to the objects on the assembly line 90 it is not necessarily the case of automobiles. The automobiles are conveyed via a conveying installation 94, e.g. on a conveyor belt or with a suspended conveying, along the assembly line 90. During the conveying of the automobiles, assembly steps or working steps are carried out on the automobiles by way of factory workers 95 positioned laterally on the assembly line 90. The factory workers 95 are co-conveyed with the same, a higher or lower speed than the automobiles parallel to the automobiles, on worker rider belts 91 arranged laterally of the assembly line 90, so that the factory workers 95 can carry out the necessary working steps on the automobiles, without the conveying of these being stopped. The worker-rider belt 21 is operated with a mat chain 92.

Figure 16:
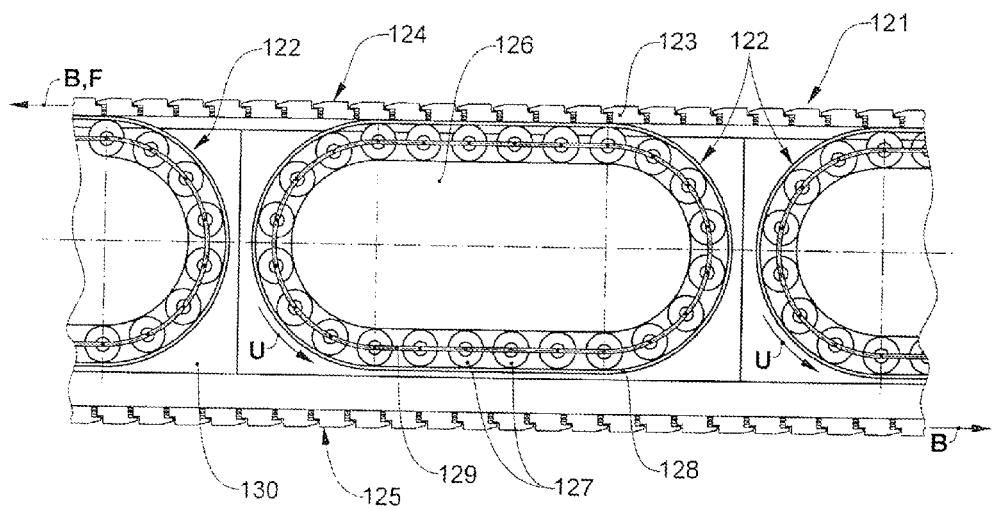
FIG. 16 is a longitudinal section through a conveying device.

The conveying device 121 according to FIG. 16, in a longitudinal section shows the upper run section 124 and the lower run section 125 of a mat chain 123. The upper run section 124 is supported in a rolling manner via a plurality of support units 122 which are arranged one after the other in the movement direction B of the mat chain 123. The support unit 122 comprises a support body 126 as well as a rolling body with a plurality of support rollers 127 which are arranged in a closed revolving path U around the support body 126. The support rollers 127 roll along the support body 126. A protective belt 128 is arranged on the outer periphery of the support unit 122 and lies above the support rollers 127, so that the mat chain 123 does not roll directly on the support rollers 126. The protective belt 128 as a closed belt is arranged revolving around the support body 126. The support units 122 moreover have side guide elements 130 which prevent the support rollers 127 from laterally sliding from the support body 126.

The support rollers 127 are connected to one another via an extensively surfaced connection element 129, into the rolling body, wherein the connection element 129 serves merely for guiding and spacing the rollers and accommodates no support forces.

Figure 17:
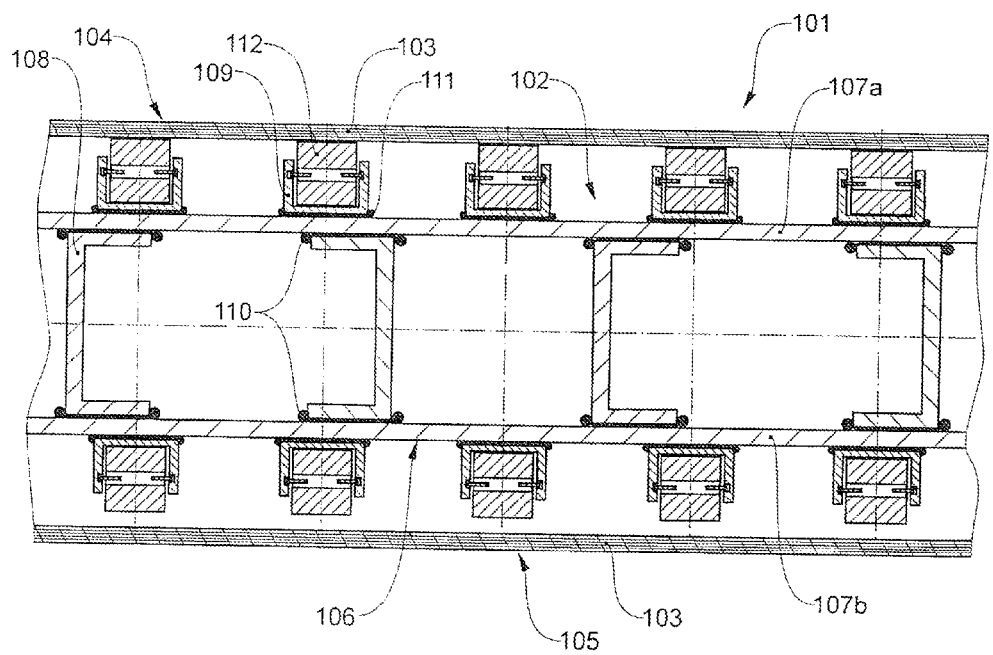
FIG. 17 is a transverse section through a further embodiment of a conveying device.
Figure 23:
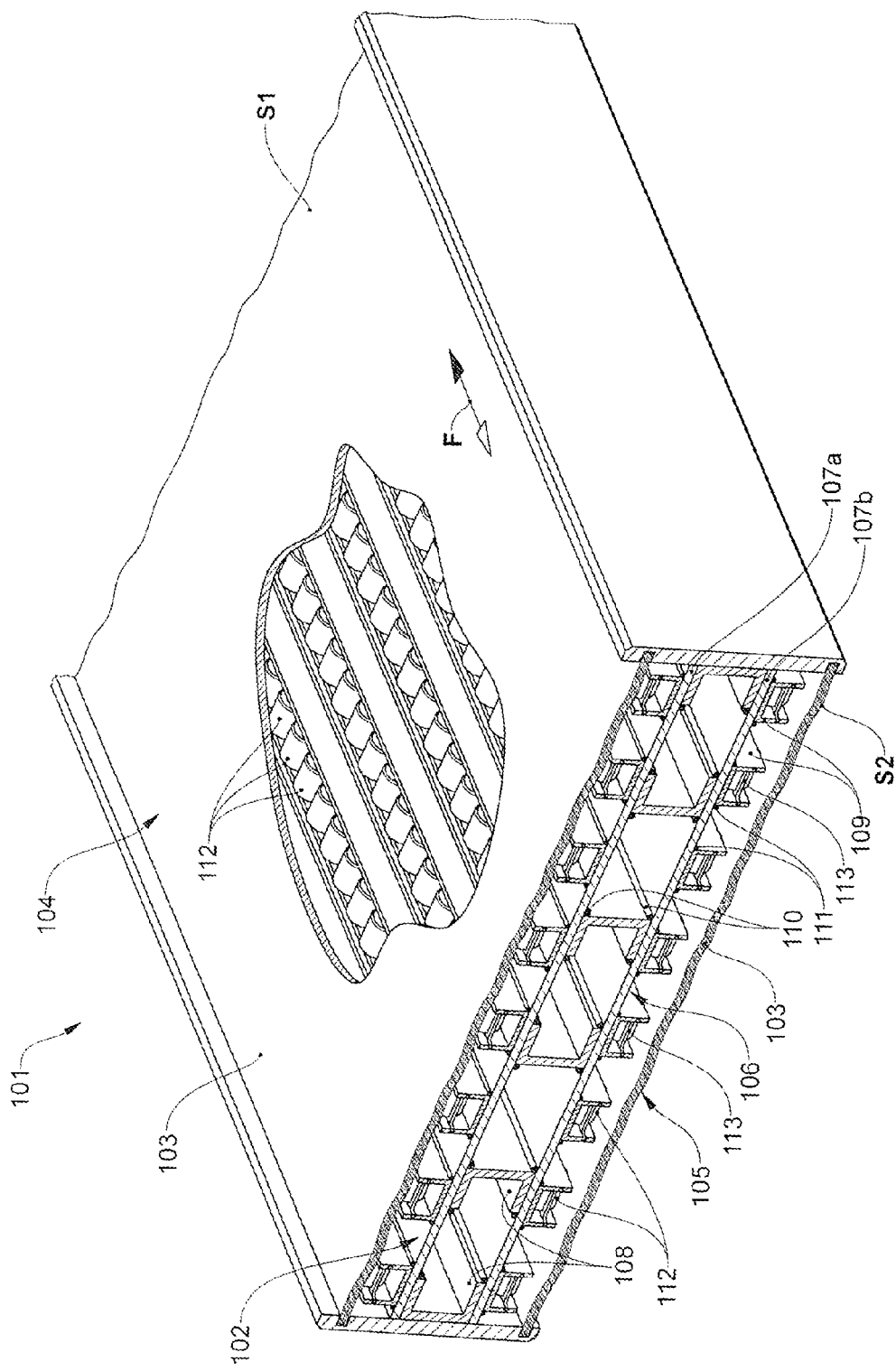
FIG. 23 is a perspective part view of the conveying device according to FIG. 17 with a further embodiment of a support device.

The conveying device 101 according to FIGS. 17 and 23 comprises a conveying member in the form of a conveyor belt 103 with an upper run section 104 and a lower run section 105 and which is deflected at two head-end regions (not shown) which lie opposite one another. A support device 102 is arranged between the two head-end regions for the rolling support of the upper run section 104.

The support device 102 has an extensively extended support body 106 which in each case comprises an upper plate element 107a facing the upper run section 104 and a lower plate element 107b facing the lower run section 105, and these elements are of e.g. metal such as aluminium, or plastic. The two plate elements 107a, 107b are held together and distanced to one another by way of connection profiles 108 which are arranged between these. The connection profiles 108 here by way of example are designed in a C-shaped or U-shaped manner. The connection profiles 108 consist e.g. likewise of metal, such as aluminium, or plastic.

Receiver bodies in the form of C-shaped or U-shaped receiver profiles 109 which run parallel next to one another and parallel to the movement direction of the conveyor belt 103 are attached on the plate elements 107a, 107b. These e.g. can be of plastic or metal such as aluminium. The receiver profiles 109 are longitudinal profiles. The receiver profiles 109 form a receiver space for support rollers 112 arranged one after the other in the movement direction of the conveyor belt 103. The support rollers 112 are led in the receivers of the receiver profiles 109 in a rolling manner.

The connection profiles 108 are bonded to the plate elements 107a, 107b in a large-surfaced or extensive manner via profile walls amid the formation of large-surfaced bonding connections 110. The longitudinal profiles 109 are likewise bonded to the outer-lying free surface side of the associated plate element 107a, 107b via the profile base, likewise amid the formation of large-surfaced or extensive bonding connections 111. Welding connections are also conceivable instead of bonding connections.

The support body 106 then on its surface side of the plate elements 107a which faces the upper run section 104 as well as on its surface side of the plate element 107b which faces the lower run section 105 in each case comprises C-shaped or U-shaped receiver profiles 109 arranged vertically above one another.

Receiver profiles 109 which are arranged in pairs above one another and are aligned vertically on one another, together with connection bodies (not shown) arranged on the end-side, form a revolving track U for the support rollers 112 and revolving around the support body 106.

The support rollers 112 are thus revolvingly guided in the receiver profiles 109 arranged above one another, around the support body 106.

The support rollers 112 are connected via a flat, flexible connection body 113 into a rolling body.

Figure 18:
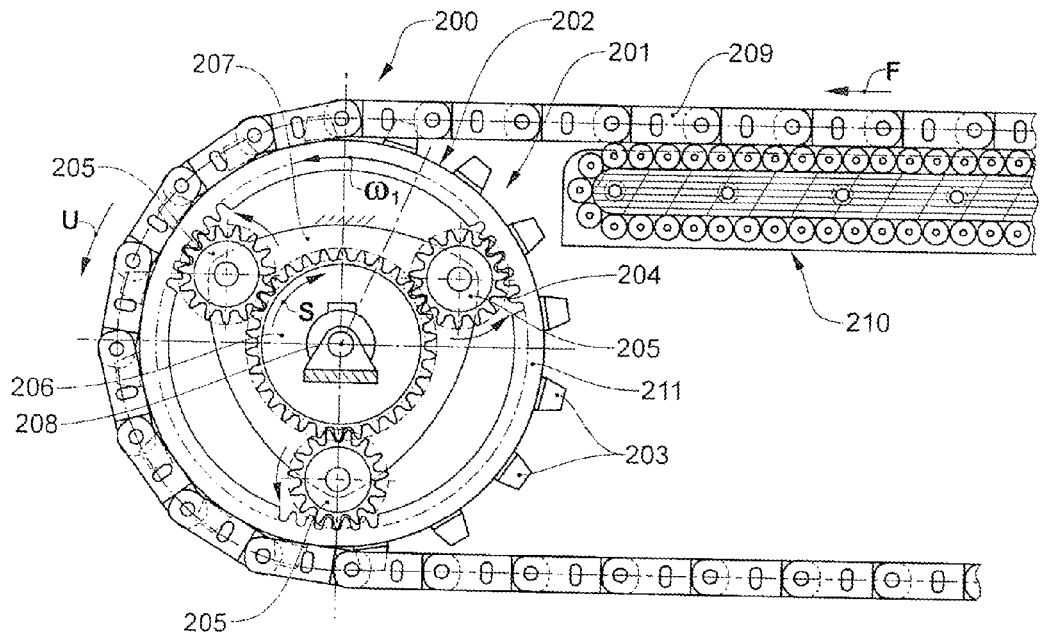
FIG. 18 is a cross section through the drive device in the region of the drive member, according to a further embodiment.
Figure 19:
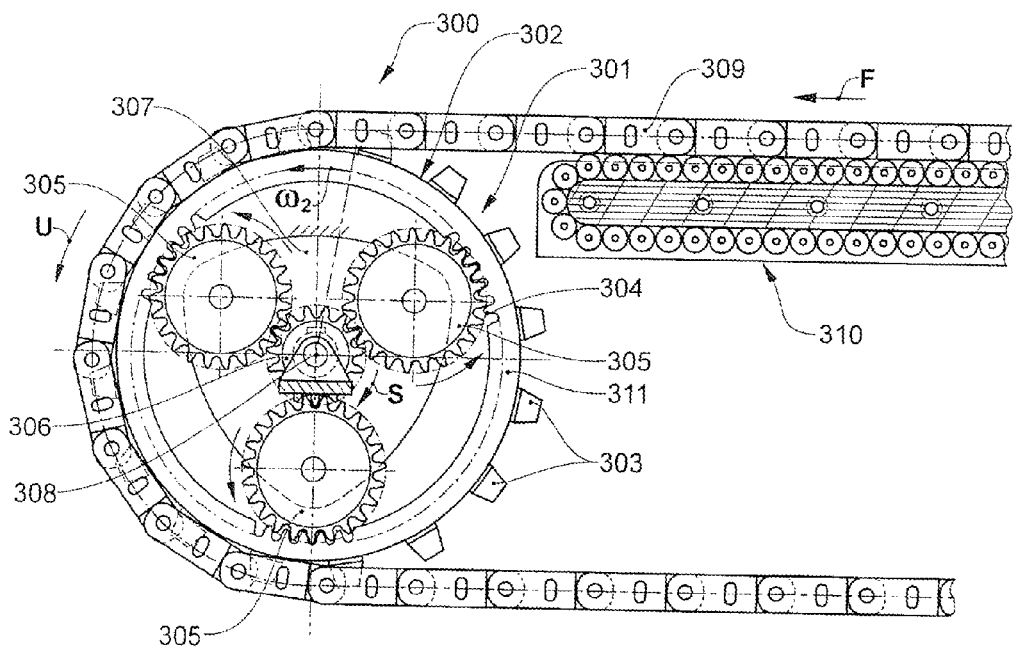
FIG. 19 is a cross section through the drive device in the region of the drive member, according to a further embodiment.

FIGS. 18 and 19 show further embodiment variants of drive devices 201, 301 of a conveying device 200, 300. The drive device 201, 301 in each case comprises a drive member 202, 302 with an outer toothing 203, 303 which engages with a positive fit into corresponding recesses of a mat chain 209, 309 which at least partly is wrapped around the drive member 202, 302. The conveying member does not necessarily need to be a mat chain. The mat chain 209, 309 with its upper run section is supported on support units 210, 310 of the described type which are equipped with rolling bodies.

The outer toothing 203, 303 is arranged on the outer periphery of a rotatable hollow wheel 211, 311 which is part of a planetary gear. The hollow wheel 211, 311 comprises an inner toothing 204, 304. The planetary gear further comprises a sun wheel 206, 306 which is rotatably guided in the rotation direction S via the drive shaft and which is accordingly coupled to the drive shaft. The sun wheel 206, 306 is surrounded in each case by three planet wheels 205, 305 which are uniformly distanced to one another. These with their toothing on the one hand engage inwards into the toothing of the sun wheel 206, 306 and on the other hand to the outside into the inner toothing 204, 305 of the hollow wheel 211, 311. The planet wheels 205, 305 are in each case rotatably arranged on a rigidly mounted planet wheel carrier 207, 307. The planet wheel carrier 207, 307 is fastened for example on a transverse component (not shown).

According to the embodiment example according to FIG. 18, the inner toothing of the hollow wheel 211 has twice the number of teeth as the sun wheel 206, so that a transmission ratio of 2:1 is set. According to the embodiment example according to FIG. 19, the inner toothing of the hollow wheel 211 has four times the number of teeth than the sun wheel 206, so that a transmission ration of 4:1 is set. The angular speed $\omega 1$ of the hollow wheel 211 according to FIG. 18 as a result is larger than the angular speed $\omega 2$ of the hollow wheel 311 according to FIG. 19.

If with regard to the drive motor it is the case of a drum motor (not shown), then the planet wheel carrier is driven instead of the sun wheel. The sun wheels here are arranged in a rotationally fixed manner on a centric, rigid shaft-like pivot.

The embodiments according to FIGS. 18 and 19 are applied for example in curve conveyors such as described in FIG. 11. The drive members which are arranged along the rotation axis of the drive device accordingly have different transmission ratios. By way of this, the drive embers move at different angular speeds $\omega 1$, $\omega 2$.

Figure 24:
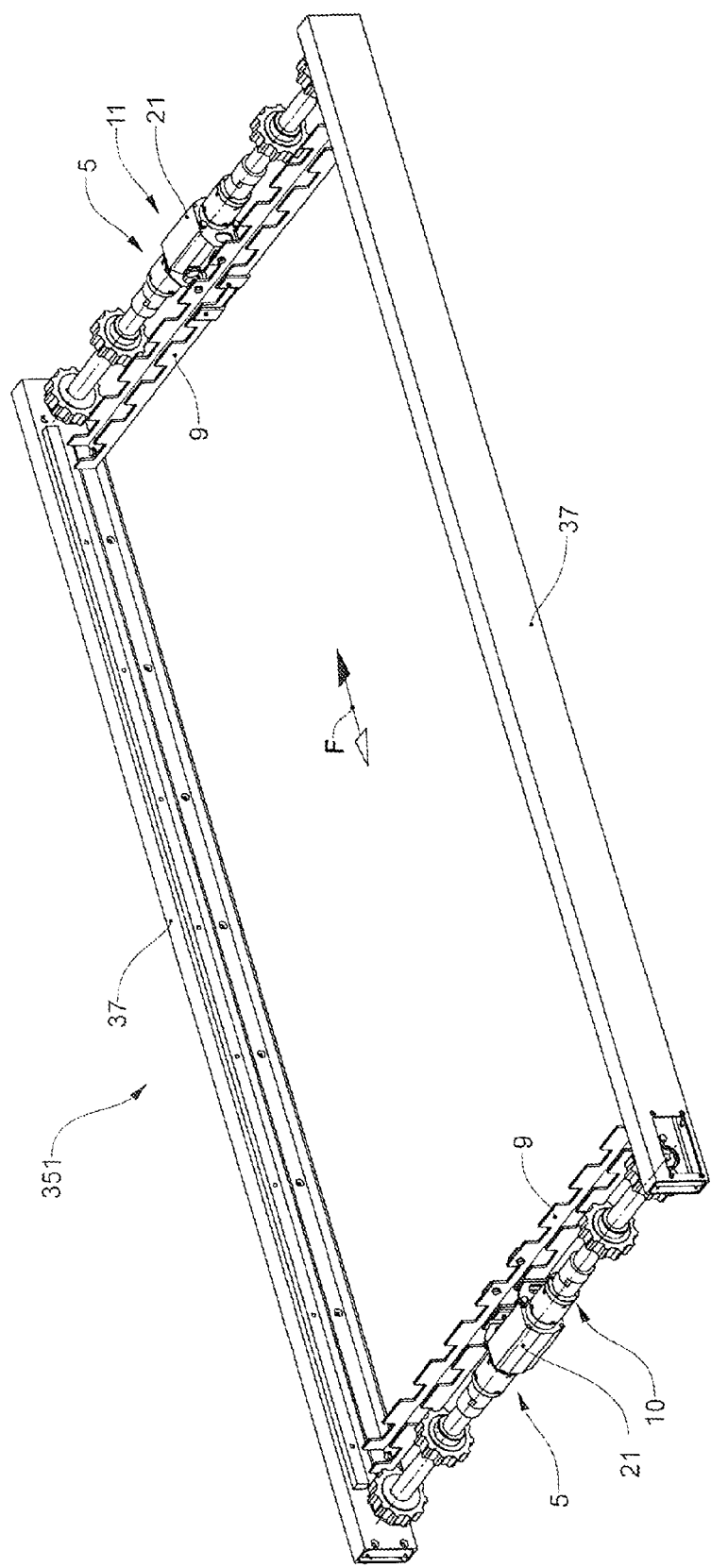
FIG. 24 is a perspective part view of a further embodiment of a conveying device according to the invention.

The part view of a further embodiment of a conveying device 351 according to the invention which is shown in FIG. 24, in both head-end regions 10, 11, comprises a drive device 5 according to the invention, in each case with a drive motor 21 according to the FIGS. 1 and 2. One or both of the drive devices 46 in the head-end regions can however also be designed according to FIG. 22.

The drive devices 5 are in each case fastened with their lateral ends on a side limitation device 37. The side limitation device 37 comprises lateral longitudinal profiles. Likewise represented are transverse components 9 which are assigned to the drive devices 5. The FIGS. 1 and 2 and the associated description are referred to for further details with regard to this, as the description is likewise applicable here.

Figure 25:
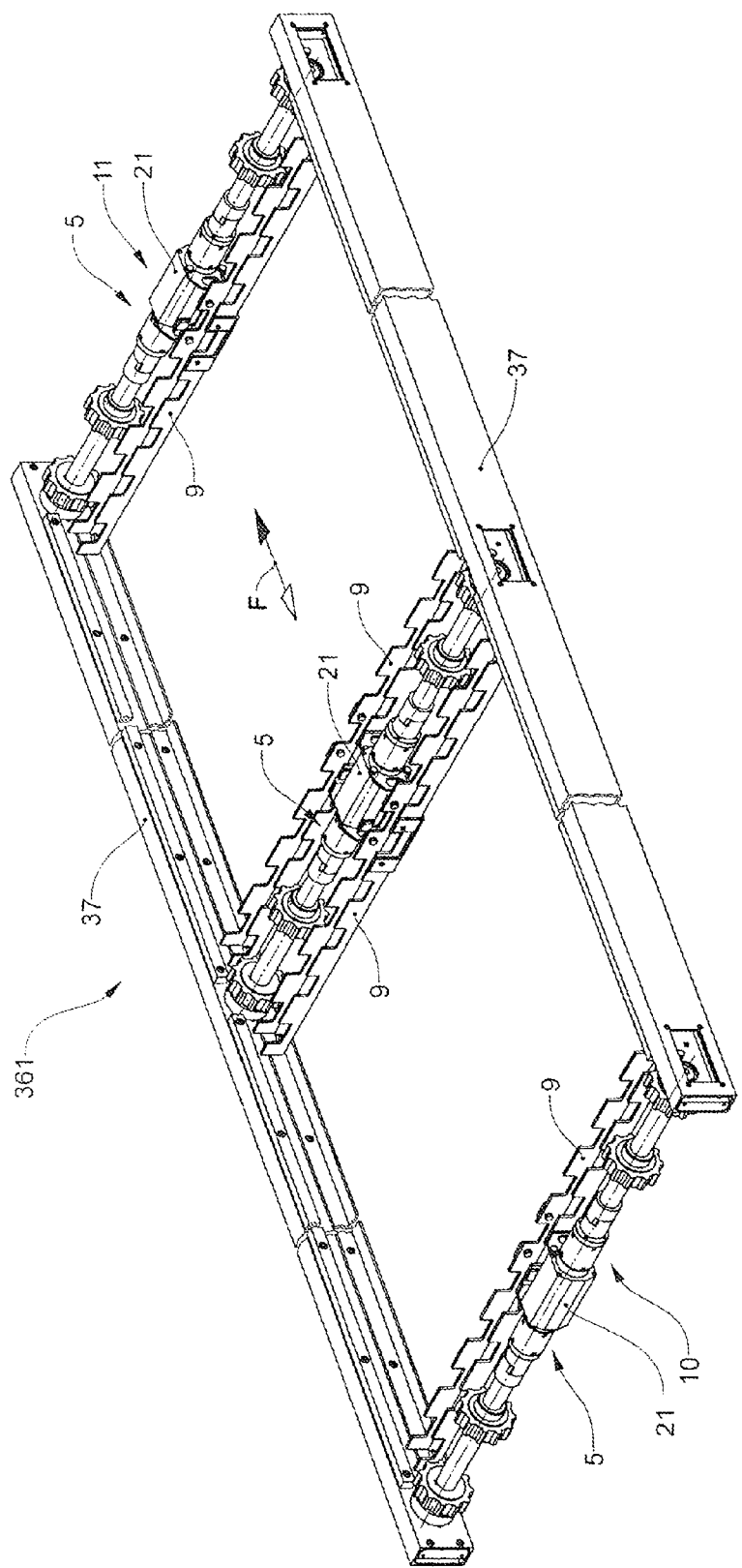
FIG. 25 is a perspective part view of a further embodiment of a conveying device according to the invention.

The part view of a further embodiment of a conveying device 361 according to the invention which is shown in FIG. 25 corresponds to the embodiment according to 24, but with the difference that the present embodiment comprises a further drive device 5 with a drive motor 21 according to FIGS. 1 and 2 which is arranged between the two drive devices 5 arranged in the head-end regions 10, 11. The additional drive device 5 is likewise fastened with its lateral ends in each case on the adjacent side limitation device 37. A transverse component 9 of the already motioned type is assigned to the additional drive device. The drive motor 21 is fastened on one of the transverse components 9.

Further details, in particular for the drive device 5, can be deduced from the FIGS. 1, 2 and 24 as well as the associated description.

Figure 26:
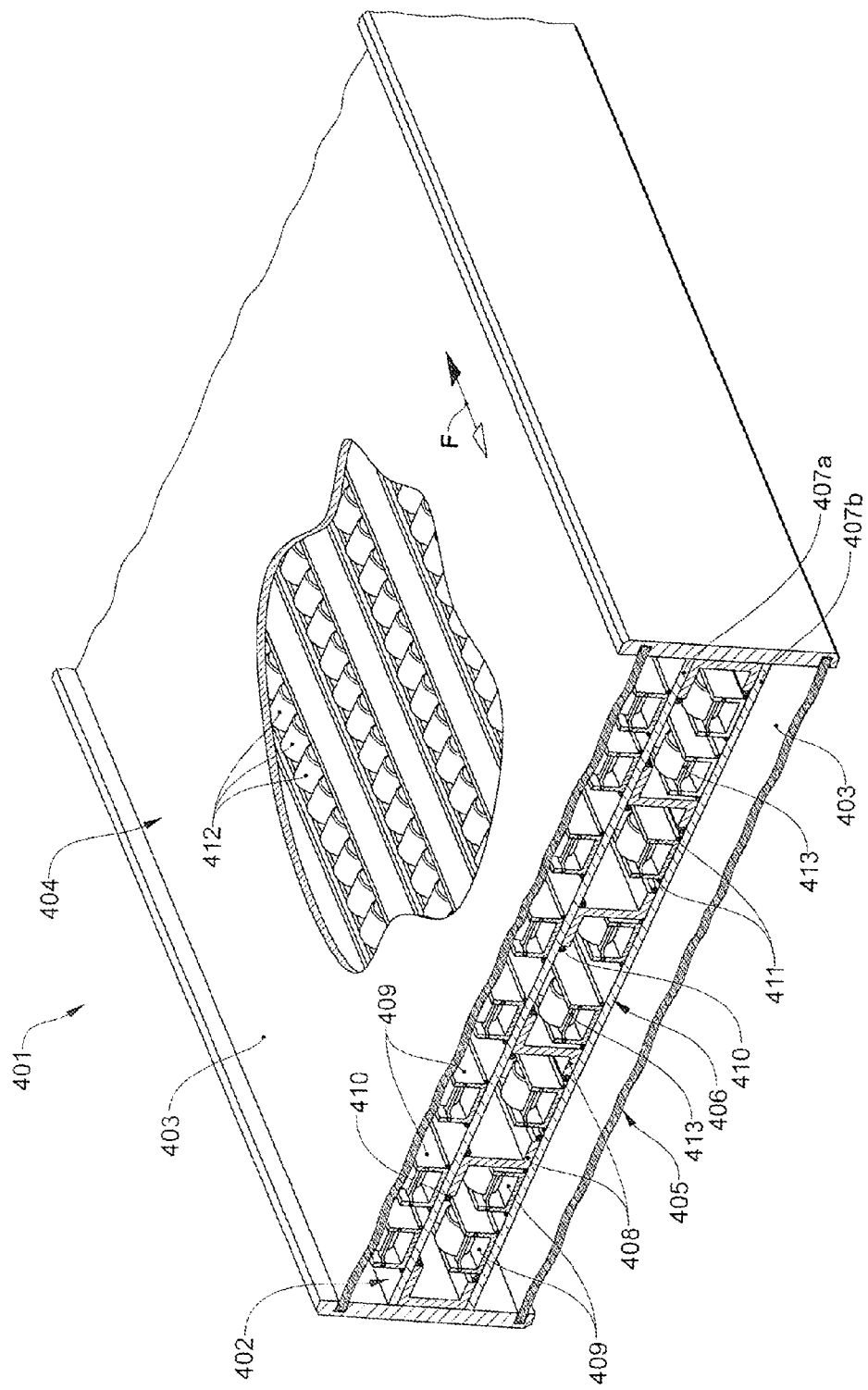
FIG. 26 is a perspective part view of a further embodiment of a support device.

FIG. 26 shows a part view of a further embodiment of a conveying device 401, in particular of the associated support device 402. The present embodiment has a similar construction as the conveying device 301 according to FIGS. 17 and 23, but with the differences mentioned hereinafter.

The conveying device 401 likewise comprises a conveying member in the form of a conveyor belt 403 with an upper run section 404 and a lower run section 405 and which is deflected in two head-end regions lying opposite one another (not shown). A support device 402 for the rolling support of the upper run section 404 is arranged between the two head-end regions.

The support device 402 comprises an extensively extended support body 406 which in each case comprises an upper plate element 407a facing the upper run section 204 and a lower plate element 407b facing the lower run section 405, wherein these plate elements are e.g. of metal such as aluminium, or of plastic. The two plate elements 407a, 407b are held together and distanced to one another by way of connection profiles 408 which are arranged between these. The connection profiles 40 are designed here for example in a Z-shaped or S-shaped manner. The connection profiles 408 consist likewise e.g. of metal such as aluminium, or of plastic.

Receiver bodies in the form of C-shaped or U-shaped receiver profiles 409 which run parallel next to one another and parallel to the movement direction of the conveyor belt 403, towards the upper run section 404, are attached on the first plate element 407a which faces the upper run section 404. The receiver profiles 409 form a receiver space for support rollers 412 which are arranged one after the other in the movement direction of the conveyor belt 403. The support rollers 412 for this are guided in the receivers of the receiver profiles 409 in a rolling manner.

C-shaped or U-shaped receiver profiles 409 likewise running parallel to the movement direction of the conveyor belt 403 are likewise arranged in the intermediate space between the two plate elements 407a, 407b. The receiver profiles 409 for this are attached on the lower plate element 407b which faces the lower run section 405.

The mentioned receiver profiles 409 are in particular designed as longitudinal profiles. They can be of plastic or of metal, such as aluminium.

The support body 406 on its surface side facing the upper run section 404 as well as between the plate elements 407, 4a, 407b in each case comprises receiver profiles 409 arranged vertically above one another.

Receiver profiles 409 arranged in pairs above one another and aligned vertically onto one another together with connection bodies (not shown) arranged on the end side in each case form a revolving track U for the support rollers 412 and which revolves around the support body 406.

The support rollers 412 are thus revolvingly guided around the support body 406 in the receiver profiles 409 which are arranged above one another.

The support rollers 412 are moreover connected via a flat, flexible connection body 413 into a rolling body.

The connection profiles 408 are bonded in a surfaced manner via profile walls to the plate elements 407a, 407b, amid the formation of large-surfaced bonding connections 410. The longitudinal profiles 409 are bonded via the profile base to the plate elements 407b assigned to these, likewise amid the formation of large-surfaced bonding connections 411. Welding connections are also conceivable instead of bonding connections.

The lower run section 405 of the conveyor belt 403 in contrast to the embodiment example according to FIGS. 17 and 23 cannot roll on the led-back support rollers 412 due to the different type of arrangement of the lower receiver profile 409 leading back the support rollers 412. The support rollers 412 in fact are led back in the intermediate space between the two plate elements 407a, 407b in a protected manner.

The further embodiment of the conveying device according to the invention which is shown in FIG. 27 again is characterised by two conveyor belts 502a, 502b which are parallel next to one another and distanced to one another. Mat chains for example are also possible instead of conveyor belts 502a, 502b.

The two conveyor belts 502a, 502b are each deflected in a common first and second head-end region 510, 511. For this, a drive device 505 according to FIGS. 1 and 2 is provided in the two head-end regions 510, 51112 and this, apart from the deflection of the continuous conveyor belt 502a, 502b, also ensures its drive. Drive members 524 are provided for driving and deflecting the conveyor belts 502a, 502b, around which drive members the conveyor belts 502a, 502b are wrapped over part of the periphery. The drive members here are designed as drive rollers.

The FIGS. 1 and 2 as well as the associated description are referred to with regard to a detailed description of the drive device 505.

The drive motor 521 belonging to the drive device 505 is arranged centrally in the free gap between the two conveyor belts 502a, 502b. The drive motors 521 are fastened on a transverse component 509 as already described with regard to the FIGS. 1 and 2. The respective description with regard to FIGS. 1 and 2 is referred to for this as well.

The two conveyor belts 502, 502b are arranged between two longitudinally running side limitation devices 537. The drive devices 505 with their lateral end sections are also fastened on the side limitation devices 537. For this, the respective description with regard to FIGS. 1 and 2 is referred to.

Figure 27:
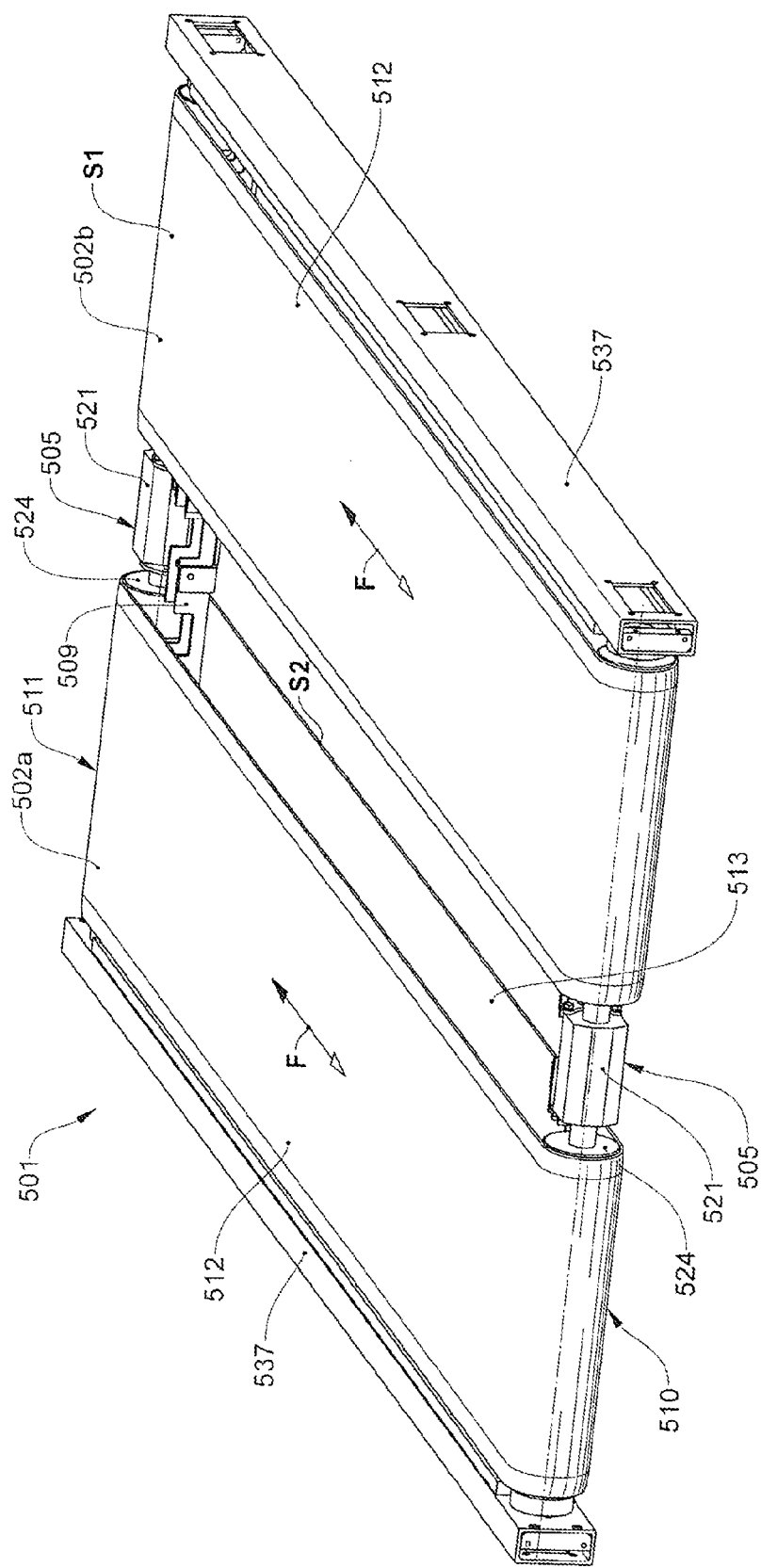
FIG. 27 is a perspective part view of a further embodiment of a conveying device according to the invention.
Figure 29:
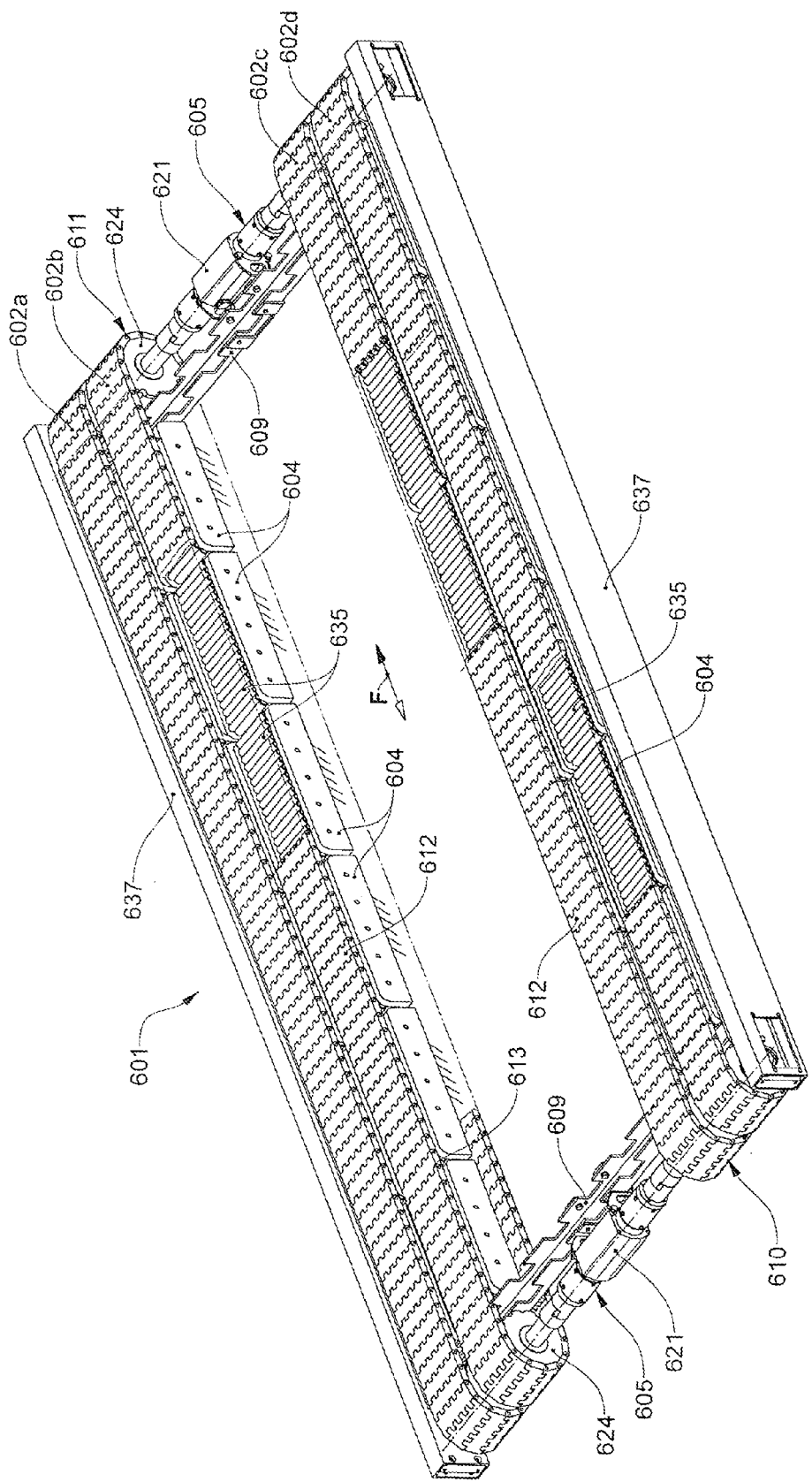
FIG. 29 is a perspective view of a further embodiment of a conveying device according to the invention.

FIG. 29 shows a further embodiment of a conveying device 601 according to the invention, which with regard to the drive arrangement is similar to the embodiment according to FIG. 27. The present embodiment is characterised by two pairs of mat chains 602a, 602b; 602c, 602d which are parallel next to one another and are distanced to one another.

The two mat chain pairs 602a, 602b; 602c, 602d are each deflected in a common first and second head-end region 610, 611. For this, a drive device 605 according to FIGS. 1 and 2 is provided in both head-end regions 610, 611, and this drive device apart from the deflection of the two continuously guided mat chain pairs 602a, 602b; 602c, 602d also ensures their drive. Drive wheel 624, around which the mat chain pairs 602a, 602b; 602c, 602d are wrapped over part of the periphery, are provided for driving and deflecting the two mat chain pairs 602a, 602b; 602c, 602d. The mat chains 602a, 602b; 602c, 602d for this comprise prominences or recesses which engage with corresponding prominences or recesses on the drive cog 264, preferably with a positive fit. Likewise, the FIGS. 1 and 2 as well as the associated description are referred to for a detailed description of the drive device 605.

The respective drive motor 521 belonging to the drive device 605 is arranged centrally in the free gap between the two mat chain pairs 602a, 602b; 602c, 602d. The drive motors 621 as already described with regard to FIGS. 1 and 2 are fastened on a transverse component 609. Here too, the respective description for FIGS. 1 and 2 is referred to.

Each mat chain pair 602a, 602b; 602c, 602d again consists of two endlessly led mat chains 602a, 602b; 602c, 602d which are parallel next to one another. The mat chains can lie directly next to one another or be distanced to one another by a gap. This gap however is significantly smaller than the gap between the pairs of mat chains 602a, 602b; 602c, 602d.

The two mat chain pairs 602a, 602b; 602c, 602d are arranged between two longitudinally running side limitation devices 637. The drive devices 605 with their lateral end sections are also fastened on the side limitation devices 637. The respective description with regard to FIGS. 1 and 2 is again referred to.

The conveying device 601 moreover comprises a support device with a plurality of support units which are arranged one after the other in the conveying direction F as well as between the head ends or head-end regions. The support units are each arranged between the upper and lower run section 612, 613 of the mat chain pair 602a, 602b; 602c, 602d. The support units 604 correspond to those shown in FIGS. 9, 10 as well as 16, 18, 19 and which have been described. The respective description of the mentioned figures is referred to with regard to further details on the construction and arrangement of the support units.

The mat chains 602a, 602b; 602c, 602d are supported in a rolling manner in the region of the upper run section 612 by way of the rolling body 365. The rolling body 635 as already described, comprises a plurality of individual rollers which are guided in a revolving manner around a support body of the support unit 604.

The conveying device 501, 601 according to the FIGS. 27 and 29 is suitable in particular as a storage space conveying device for a storage system with pallet spaces, in particular for a high-bay warehouse. The two conveyor belts 502a, 502b or mat chain pairs 602a, 602b; 602c, 602d which are distanced to one another each form a conveying track for the contact regions of a pallet.

Figure 28:
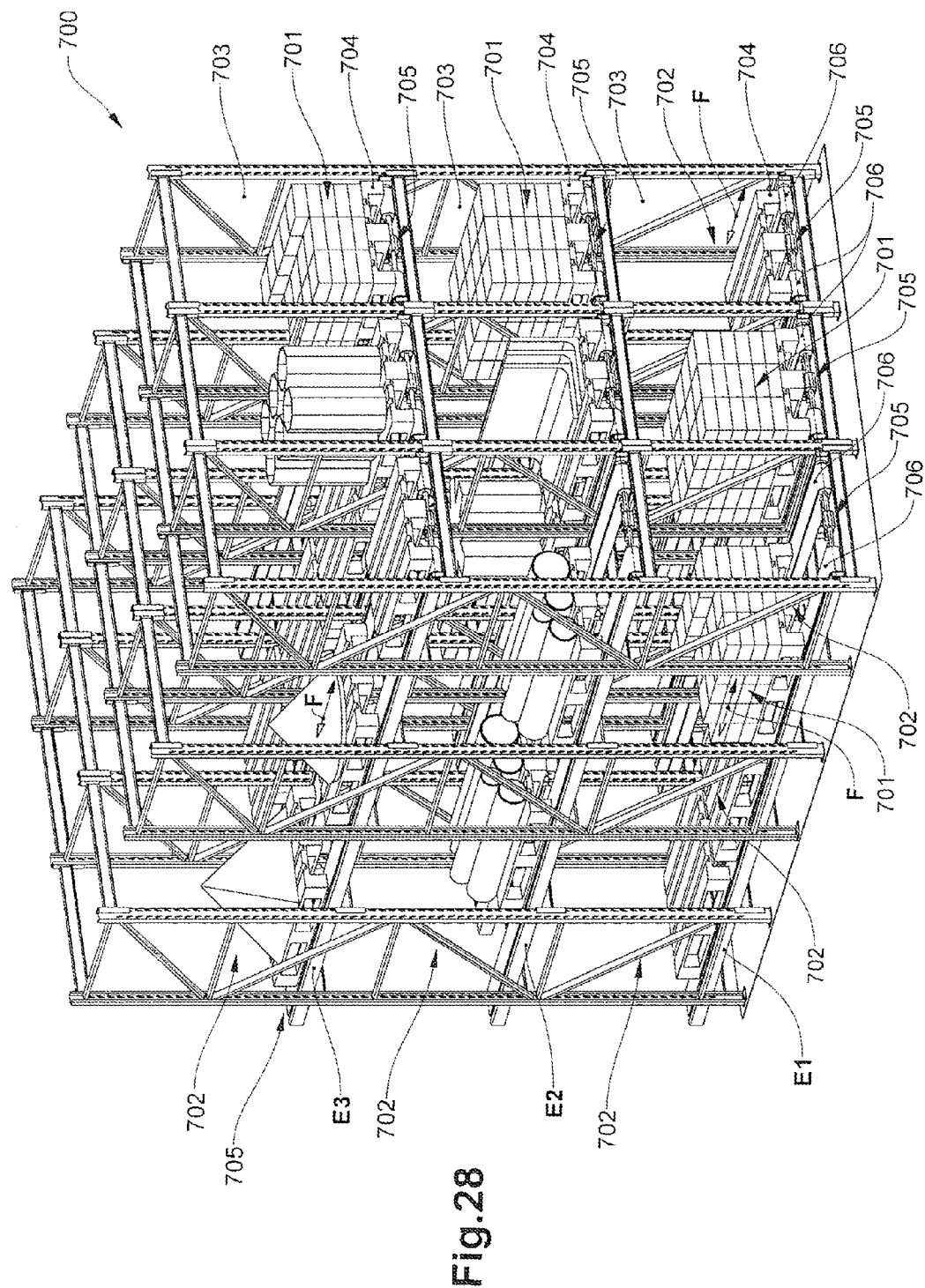
FIG. 28 is a perspective view of a high-bay warehouse with conveying devices according to the invention.

FIG. 28 shows a high-bay warehouse system 700 with pallet spaces 702 arranged in three dimensions. The high-bay warehouse system 700 comprises a plurality of storage levels E1, E2, E3 arranged over one another, wherein a plurality of pallet spaces 702 is provided in each storage plane E1, E2 E3. The storage system 700 comprises a plurality of release and removal locations 703 arranged above one another and next to one another. A plurality of pallet spaces 702 which are arranged one after the other in a row in the conveying direction and are arranged on a storage level E1, E2, E3 are assigned to each of these release and removal locations 703.

The release location can correspond to the removal location, so that the palleted stored object 701 is released to the storage system 700 and taken again from this at the same location. The release location and the removal locations 703 can however also be spatially separated and e.g. lie above one another. In this case, the stored object 701 is released at the release location and is taken at the removal location (not shown).

For storing the palleted product 701, this is released at the release location 703 and is conveyed via the conveying device 705 according to the invention, onto the envisaged pallet space 702. The palleted stored object or stored goods 701 are stored on the conveying device 705.

The conveying device 705 can e.g. be a conveying device 501, 601 according to FIG. 27 or 29.

For removal of the palleted stored object, the stored object 701 in the reverse sequence is fed via the conveying device 705 according to the invention to the removal location 703 and is taken at this.

The transfer of the palleted stored object 701 to the release location 703 and the take-over of the stored object 701 from the removal location 703 is effected e.g. via transport apparatus such as a lift truck or lifting vehicle (not shown).

According to a particular embodiment variant, each pallet space 702 comprises an independent and individually controllable conveying device 705 according to the invention. The conveying devices 705 of several palleted spaces 702 arranged in series one after the other in the conveying direction F, in each case with a common release location and/or removal location 703 are accordingly likewise arranged in series one after the other. The conveying member 706 such as a conveyor belt or mat chain here extends in each case only over the longitudinal extension of the pallet space 702 in the conveying direction F.

The palleted storage object or stored goods 701 which must be fed to a pallet space 702 or away from this, can now be conveyed past the individual conveying devices 705 from the pallet space 702 to the removal location 703 or from the release location 703 to the pallet space 702. With this procedure, the palleted stored object 701 is pushed in each case by the one conveying device 705 onto the conveying device 705 which is adjacent or subsequent in the conveying direction F or is taken from this.

However, one can also envisage a common conveying device 705 according to the invention being provided for a row of pallet spaces 702 which are arranged one after the other in the conveying direction F and which in each case have a common release location and/or removal location 703, wherein the conveying member of this conveying device such as a conveyor belt or mat chain, extends over all pallet spaces 702.

The invention claimed is:

1. A conveying device, comprising:
    two side limitation devices that are distanced from one another and run parallel to one another in a conveying direction,
    at least one extensively extended conveying member with an upper run section and a lower run section, said conveying member being arranged in a revolving manner between the side limitation devices and being deflected in two head-end regions distanced from one another,
    a support device with at least one support unit with rollers for the rolling support of the conveying member, said support device being arranged between the side limitation devices,
    at least one drive device with at least one electrical drive motor and with at least one drive shaft coupled to the at least drive motor and having at least one drive member for the direct drive of the conveying member at least partly wrapping the drive member,
    wherein the drive device forms a deflection location for the conveying member, wherein:
    the at least one drive device within the conveying device is arranged in a head-end region:
        between a conveying plane formed by the upper run section and a return plane formed by the lower run section, and
        along the conveying direction between the two head-ends as well as
        between the side limitation devices,
    wherein:
        the at least one drive motor is designed for picking up a torque from two locations on the drive motor that lie opposite one another and lie in a common axis, and the drive motor is coupled to drive shafts arranged on both sides.

2. The conveying device according to claim 1, wherein the drive device comprises at least two drive motors.

3. The conveying device according to claim 1, wherein the geometric rotation axes of the motor shaft and of the drive shaft are arranged in a common plane and preferably congruently to one another.

4. The conveying device according to claim 1, wherein the at least one drive shaft is arranged and rotatably mounted centrically in the geometric rotation axis of the drive device.

5. The conveying device according to claim 1, wherein the at least one drive motor comprises motor shaft sections that lead away from this on both sides and that are coupled directly or indirectly to drive shafts arranged on both sides.

6. The conveying device according to claim 1, wherein the at least one drive motor is fastened on a transverse component, and the transverse component preferably on both sides is fastened directly or indirectly on the side limitation device.

7. The conveying device according to claim 1, wherein, in each case, a gear unit is attached on the drive motor on both sides of the at least one drive motor and takes the torque from the motor shaft, and the gear shafts of the gear units are connected directly or indirectly to the drive shafts, wherein the gear shafts, the drive shafts and the motor shaft are arranged coaxially.

8. The conveying device according to claim 1, wherein the drive member is a drive roller or drive cog which is attached on the drive shaft in a rotationally fixed manner.

9. The conveying device according to claim 1, wherein the drive shafts are rotatably mounted and axially secured on both sides of the drive device on the respective side limitation device or on mounting elements connected thereto.

10. The conveying device according to claim 1, wherein the drive device has a mirror-symmetric construction, wherein a drive motor is arranged centrally.

11. The conveying device according to claim 1, wherein the conveying device comprises a transformer for feeding the drive motor with an electric voltage, wherein the transformer within the conveying device is arranged:
    between side limitation devices as well as
    between a conveying plane formed by the upper run section and a return plane formed by the lower run section, and
    along the conveying direction between the two head-ends.

12. The conveying device according to claim 1, wherein the conveying device comprises a control unit for controlling the drive device, wherein the control unit within the conveying device is arranged:
- between side limitation devices as well as
- between a conveying plane formed by the upper run section and a return plane formed by the lower run section, and
- along the conveying direction between the two head-ends.

13. The conveying device according to claim 12, wherein the conveying device comprises a mains apparatus for feeding the control unit for the drive device, wherein the mains apparatus within the conveying device is arranged:
- between side limitation devices as well as
- between a conveying plane formed by the at least the upper run section and a return plane formed by the at least one lower run section, and
- along the conveying direction between the two head-ends.

14. The conveying device according to claim 1, wherein:
- a. the support device or support unit comprises one or more stationarily axially rotatably mounted rollers or
- b. the support unit comprises a support body and a rolling body with a multitude of rollers which are revolvingly arranged in a closed circuit around the support body, or
- c. the conveying member at its flat side which faces the support device comprises rollers that are stationarily and axially rotatably mounted on the conveying member.

15. The conveying device according to claim 1, wherein the conveying member is designed in a single-part or multi-part manner.

16. The conveying device according to claim 1, wherein the conveying device comprises a deflection member that is assigned to the drive device and that deflects the conveying member, in the region of the lower run section, to the drive member, so that the wrapping angle of the conveying member around the at least one drive member is more than 180°.

17. The conveying device according to claim 1, wherein the first as well as the second head-end region is provided with a drive device.

18. The conveying device according to claim 1, wherein means are provided that permit the drive members arranged along the rotation axis to be operated at different angular speeds.

19. The conveying device according to claim 1, comprising:
- at least one revolving, extensively extended conveying member with an upper run section and a lower run section and that is deflected in two head-end region that are distanced to one another,
- a support device arranged between the two head-end regions,
- a drive device, in particular arranged in a head-end region, wherein:

the support device is designed for the rolling support of the upper run section and comprises an extensively extended support body comprising two surface elements that are held together and distanced to one another by way of connection profiles arranged between the surface elements, and receiver bodies are attached on the surface elements and receive support rollers or rolling bodies for the support of the upper run section.

20. The conveying device according to claim 1, wherein the conveying device, seen in the conveying direction, comprises several conveying members that are arranged parallel next to one another, and the conveying members are driven and deflected via at least one common drive device.

21. A conveying device, comprising:
- two side limitation devices that are distanced from one another and run parallel to one another in a conveying direction,
- at least one extensively extended conveying member with an upper run section and a lower run section, said conveying member being arranged in a revolving manner between the side limitation devices and being deflected in two head-end regions distanced from one another,
- a support device with at least one support unit with rollers for the rolling support of the conveying member, said support device being arranged between the side limitation devices,
- at least one drive device with at least one electrical drive motor and with two drive shafts coupled to the at least drive motor via a gear unit and having at least one drive member for the direct drive of the conveying member at least partly wrapping the drive member,
- wherein the drive device forms a deflection location for the conveying member, wherein:
- the at least one drive device within the conveying device is arranged in a head-end region:
- between a conveying plane formed by the upper run section and a return plane formed by the lower run section, and
- along the conveying direction between the two head-ends as well as between the side limitation devices, wherein:
- the rotation axis of the motor shaft lies at an angle to the rotation axis of drive shafts and the torque is transmitted via the gear unit, which is designed as an angular gear, from the motor shaft onto the drive shafts arranged on both sides of the gear unit.

22. The conveying device according to claim 1, wherein, in each case, a rotationally elastic and/or flexurally elastic shaft coupling is attached between the at least one drive motor and the at least one drive shaft, in particular between a gear unit and the drive shaft.

* * * * *